(12) United States Patent
Nakagawa et al.

(10) Patent No.: US 10,215,077 B2
(45) Date of Patent: Feb. 26, 2019

(54) ENGINE CONTROL APPARATUS

(71) Applicant: HITACHI AUTOMOTIVE SYSTEMS, LTD., Ibaraki (JP)

(72) Inventors: Shinji Nakagawa, Tokyo (JP); Toshio Hori, Tokyo (JP)

(73) Assignee: HITACHI AUTOMOTIVE SYSTEMS, LTD, Ibaraki (JP)

( * ) Notice: Subject to any disclaimer, the term of this patent is extended or adjusted under 35 U.S.C. 154(b) by 23 days.

(21) Appl. No.: 15/507,909

(22) PCT Filed: Aug. 5, 2015

(86) PCT No.: PCT/JP2015/072160
§ 371 (c)(1),
(2) Date: Mar. 1, 2017

(87) PCT Pub. No.: WO2016/035498
PCT Pub. Date: Mar. 10, 2016

(65) Prior Publication Data
US 2017/0284268 A1 Oct. 5, 2017

(30) Foreign Application Priority Data

Sep. 5, 2014 (JP) .................................. 2014-181266

(51) Int. Cl.
*F01N 3/023* (2006.01)
*F01N 9/00* (2006.01)
(Continued)

(52) U.S. Cl.
CPC ............. *F01N 9/002* (2013.01); *F01N 3/021* (2013.01); *F01N 3/023* (2013.01); *F01N 9/005* (2013.01);
(Continued)

(58) Field of Classification Search
CPC .......... F01N 3/023; F01N 9/002; F01N 9/005; F01N 11/00; F01N 11/002; F01N 11/005;
(Continued)

(56) References Cited

U.S. PATENT DOCUMENTS

2008/0041035 A1* 2/2008 Sawada ................... F01N 3/035
 60/277
2010/0186377 A1 7/2010 Shibata et al.
(Continued)

FOREIGN PATENT DOCUMENTS

DE 102007059523 A1 6/2009
JP 2008-075458 A 4/2008
(Continued)

OTHER PUBLICATIONS

International Search Report for WO 2016/035498 A1, dated Dec. 1, 2015.
(Continued)

*Primary Examiner* — Audrey K Bradley
(74) *Attorney, Agent, or Firm* — Volpe and Koenig, P.C.

(57) ABSTRACT

Provided is an engine control apparatus capable of detecting degradation in particulate filter performance. An input unit receives a first signal indicating an exhaust gas state ($Tpf\_2$) inside or downstream of a particulate filter that traps particulate substance contained in engine exhaust gas. A determination unit 16a determines whether the particulate filter is degraded on the basis of the exhaust gas state ($Tpf\_2$) indicated by the first signal in a period (fFC=1) in which fuel supply to the engine is blocked.

13 Claims, 24 Drawing Sheets

<EMBODIMENT 1 AND 9>

(51) Int. Cl.
*F01N 11/00* (2006.01)
*F01N 3/021* (2006.01)

(52) U.S. Cl.
CPC ............ *F01N 11/00* (2013.01); *F01N 11/002* (2013.01); *F01N 2550/04* (2013.01); *F01N 2560/022* (2013.01); *F01N 2560/025* (2013.01); *F01N 2560/06* (2013.01); *F01N 2900/1602* (2013.01); *F01N 2900/1606* (2013.01)

(58) Field of Classification Search
CPC ............... F01N 11/007; F01N 2550/04; F01N 2900/1602; F01N 2900/1606
See application file for complete search history.

(56) References Cited

U.S. PATENT DOCUMENTS

2010/0263355 A1   10/2010   Zhang

2011/0225954 A1 *  9/2011   Miyata ................... F01N 11/00
                                                              60/277

FOREIGN PATENT DOCUMENTS

| JP | 2009-019557 A | 1/2009 |
| JP | 2011-099451 A | 5/2011 |
| JP | 2013-002366 A | 1/2013 |
| JP | 2013-174170 A | 9/2013 |
| JP | 2014-098362 A | 5/2014 |
| JP | 2015-151869 A | 8/2015 |
| KR | 101338669 B1 * | 12/2013 |
| WO | 2005/124118 A1 | 12/2005 |
| WO | 2015/118856 A | 8/2015 |

OTHER PUBLICATIONS

Extended European Search Report dated Mar. 2, 2018 for the European Application No. 15838483.4.

* cited by examiner

<EMBODIMENTS 1 TO 10>

<EMBODIMENTS 1 TO 10>

<EMBODIMENT 1 AND 9>

<EMBODIMENTS 1, 10, AND 11>

<PARTICULATE FILTER ABNORMALITY DETERMINATION UNIT>
PROCESSING PERIOD: 10ms

<EMBODIMENT 2>

<EMBODIMENTS 2>

<PARTICULATE FILTER ABNORMALITY DETERMINATION UNIT>
PROCESSING PERIOD: 10ms

⟨EMBODIMENT 3⟩

<EMBODIMENTS 3>

<PARTICULATE FILTER ABNORMALITY DETERMINATION UNIT>
PROCESSING PERIOD: 10ms

<EMBODIMENT 4 AND 7>

⟨EMBODIMENTS 4⟩

⟨PARTICULATE FILTER ABNORMALITY DETERMINATION UNIT⟩
PROCESSING PERIOD: 10ms

<EMBODIMENT 5>

<EMBODIMENTS 5>

<PARTICULATE FILTER ABNORMALITY DETERMINATION UNIT>
PROCESSING PERIOD: 10ms

<EMBODIMENT 6>

⟨EMBODIMENTS 6⟩
⟨PARTICULATE FILTER ABNORMALITY DETERMINATION UNIT⟩
PROCESSING PERIOD: 10ms

⟨EMBODIMENTS 7⟩
⟨PARTICULATE FILTER ABNORMALITY DETERMINATION UNIT⟩
PROCESSING PERIOD: 10ms

<EMBODIMENT 8>

<EMBODIMENT 8>
<FUEL CUT PARTICULATE FILTER DOWNSTREAM TEMPERATURE PREDICTION VALUE OPERATION UNIT>
PROCESSING PERIOD: 10ms

<EMBODIMENT 8>
<PARTICULATE FILTER ABNORMALITY DETERMINATION UNIT>
PROCESSING PERIOD: 10ms

⟨EMBODIMENTS 9⟩

⟨PARTICULATE FILTER ABNORMALITY DETERMINATION UNIT⟩
PROCESSING PERIOD: 10ms

<EMBODIMENT 10>

<EMBODIMENT 10>

<FUEL INJECTION TIMING OPERATION UNIT>
PROCESSING PERIOD: 10ms

<EMBODIMENT 11>

⟨EMBODIMENTS 11⟩

⟨EMBODIMENT 11⟩

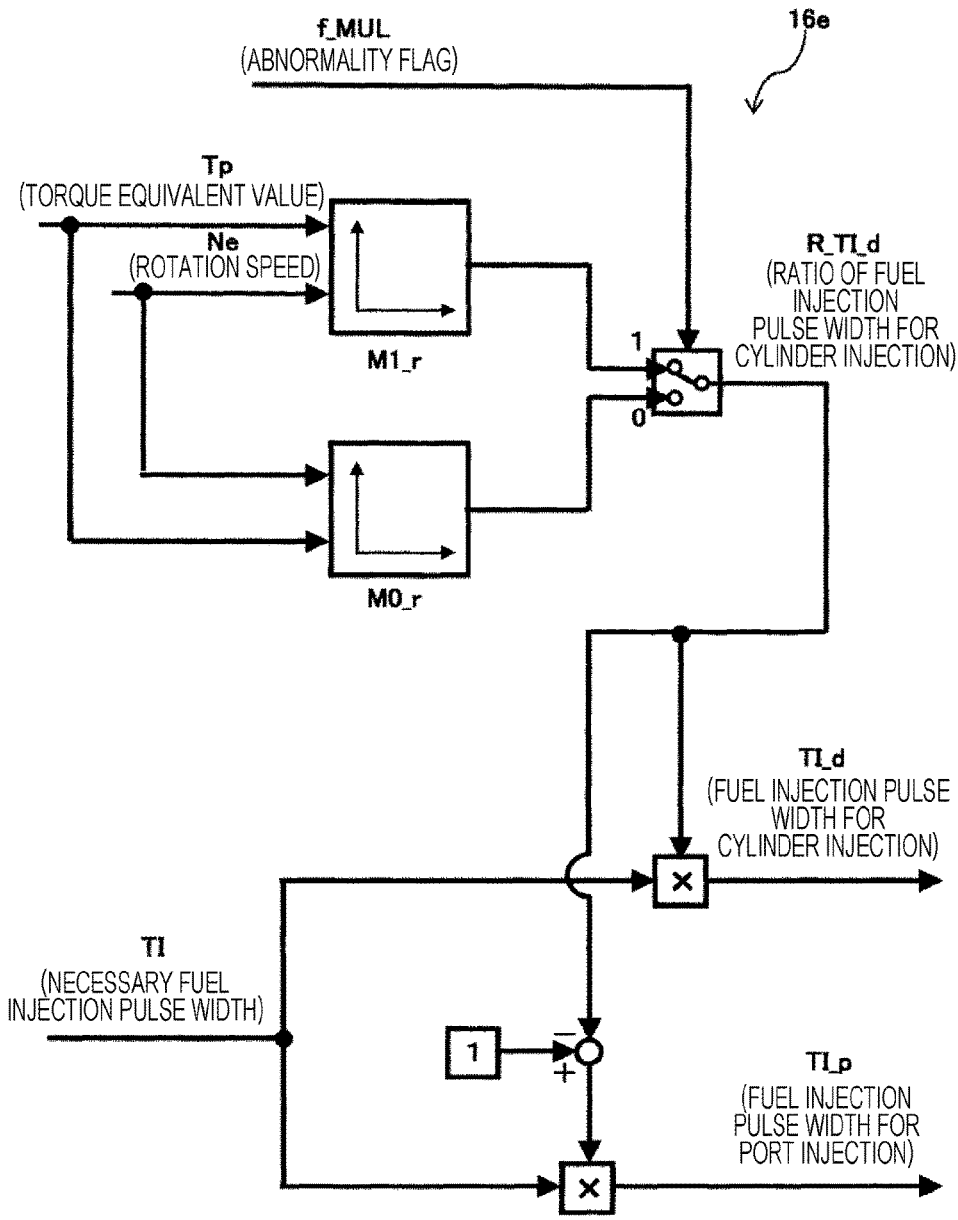

ENGINE CONTROL APPARATUS

TECHNICAL FIELD

The present invention relates to an engine control apparatus and particularly, to an engine control apparatus that detects performance degradation of a particulate filter mounted in a spark ignition engine.

BACKGROUND ART

As a background art of the present technical field, "an exhaust emission control apparatus capable of improving combustion efficiency of particulate substances deposited on a filter without causing an excessive temperature rise of the filter" is known (for example, refer to PTL 1).

PTL 1 describes "the exhaust emission control apparatus includes a filter provided in an exhaust passage of an engine to capture particulate substances contained in exhaust, an exhaust throttle valve interposed in the exhaust passage of a downstream side of the filter, a concentration acquisition unit acquiring an oxygen concentration in the exhaust flowing into the filter, a temperature acquisition unit acquiring a carrier temperature of the filter, and a control unit controlling an opening of the exhaust throttle valve, on the basis of the oxygen concentration acquired by the concentration acquisition unit and the carrier temperature acquired by the temperature acquisition unit, at the time of regenerating the filter" (refer to [Claim 1]).

In addition, "an internal combustion engine control apparatus capable of surly avoiding occurrence of an excessive temperature rise of a PM filter in a stoichiometric burn engine including the PM filter in an exhaust passage" is known (for example, refer to PTL 2).

PTL 2 describes "the internal combustion engine includes a particulate filter trapping particulate substances contained in exhaust gas in the exhaust passage and the internal combustion engine control apparatus executes a stoichiometric burn operation using control to realize a theoretical air-fuel ratio as basic control of an air-fuel ratio. The internal combustion engine control apparatus includes a fuel cut control unit executing fuel cut at the time of deceleration of the internal combustion engine, a filter OT determination unit determining whether the excessive temperate rise of the particulate filter occurs by execution of the fuel cut, and a fuel cut prohibition unit prohibiting execution of the fuel cut at the time of deceleration, when it is determined that the excessive temperate rise of the particulate filter occurs" (refer to [Claim 1]).

CITATION LIST

Patent Literature

PTL 1: Japanese Unexamined Patent Publication No. 2013-174170
PTL 2: Japanese Unexamined Patent Publication No. 2011-99451

SUMMARY OF INVENTION

Technical Problem

Oxygen and a temperature are necessary to combust soot trapped in the particulate filter. In the particulate filter included in a diesel engine, an oxygen concentration in engine exhaust is high, but an exhaust temperature is low. For this reason, control to increase the exhaust temperature compulsorily is executed to combust the soot.

In a spark ignition engine (gasoline engine), an engine exhaust temperature is high, but an oxygen concentration in exhaust is low. However, because the oxygen concentration increases at the time of the fuel cut occurring in deceleration, conditions of the temperature and the oxygen concentration are ready and the soot trapped in the particulate filter is combusted (oxidized).

Here, in the technologies described in PTL 1 and PTL 2, the excessive temperature at the time of regeneration can be suppressed. However, even though the excessive temperature at the time of regeneration is suppressed, performance degradation of the particulate filter occurs due to combusting of the soot. For this reason, it is required to detect the performance degradation of the particulate filter.

An object of the present invention is to provide an engine control apparatus capable of detecting performance degradation of a particulate filter.

Solution to Problem

In order to solve the above issue, the present invention includes: an input unit which receives a first signal indicating a state of exhaust gas in an inside or downstream of a particulate filter trapping particulate substances contained in the exhaust gas of an engine; and a determination unit which determines whether the particulate filter is degraded, on the basis of the state of the exhaust gas indicated by the first signal, in a period in which fuel supply to the engine is blocked.

Advantageous Effects of Invention

According to the present invention, performance degradation of a particulate filter can be detected. Other objects, configurations, and effects will become apparent from the following description of embodiments.

BRIEF DESCRIPTION OF DRAWINGS

FIG. 26 is a block diagram of a fuel injection pulse width operation unit according to an eleventh embodiment of the present invention.

DESCRIPTION OF EMBODIMENTS

Figure 1:
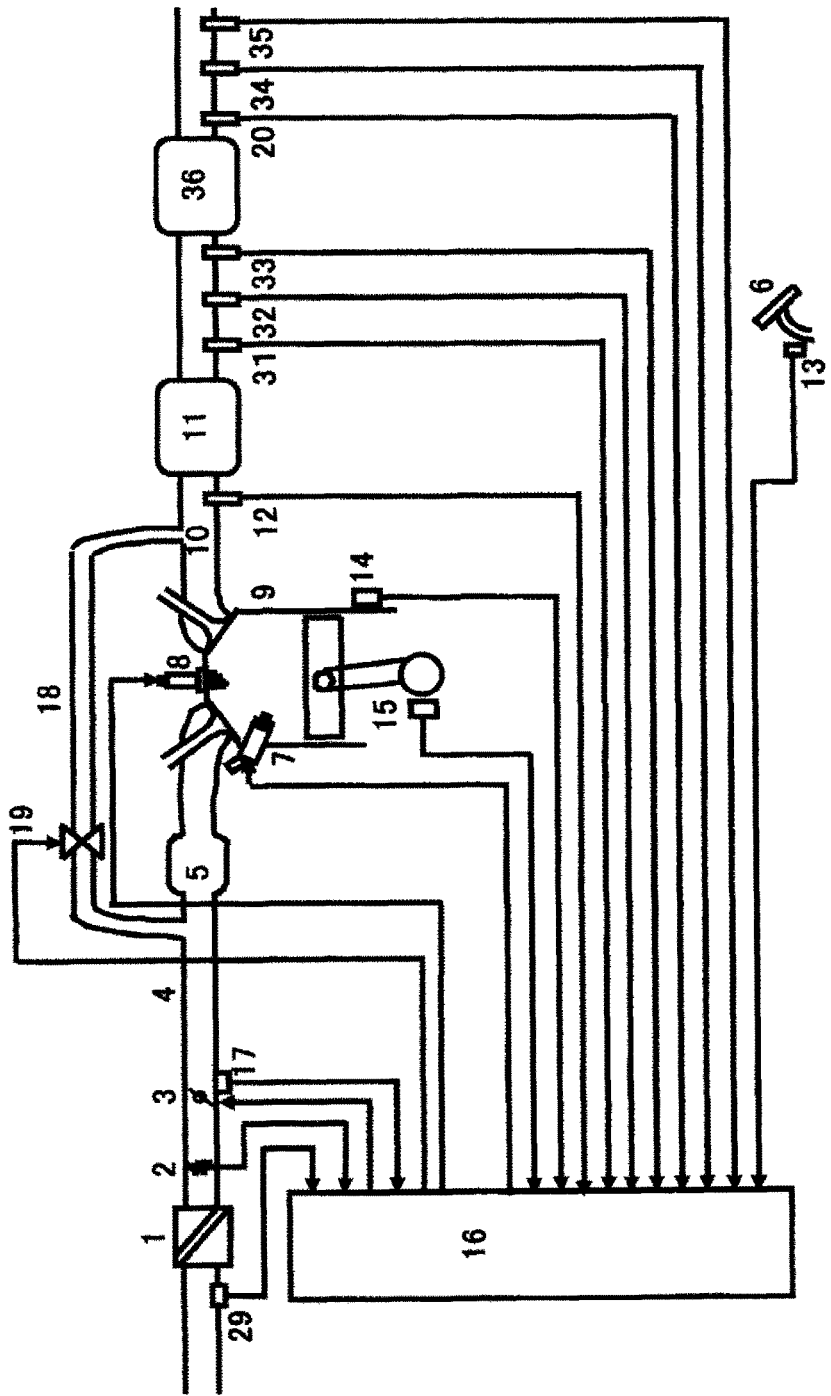
FIG. 1 is a system configuration diagram of an engine 9 including a control unit according to first to tenth embodiments of the present invention.

Hereinafter, a configuration and an operation of each of engine control apparatuses according to first to eleventh embodiments of the present invention will be described using the drawings. In the individual drawings, the same reference numeral shows the same portion. The engine control apparatus diagnoses performance degradation of a particulate filter trapping particulate substances contained in exhaust gas of an engine, as described below.
(System Configuration of Engine)

First, a system configuration of an engine 9 including a control unit 16 (engine control apparatus) will be described. FIG. 1 is a system configuration diagram of the engine 9 including the control unit 16 according to the first to tenth embodiments of the present invention.

In the engine 9 configured using multiple cylinders (here, four cylinders), external air passes through an air cleaner 1 and flows into the cylinders via an intake manifold 4 and a collector 5. An inflow air amount is adjusted by an electronic throttle 3.

In an air flow sensor 2, the inflow air amount is detected. In addition, an intake air temperature is detected by an intake air temperature sensor 29. In a crank angle sensor 15, a signal for every 10 degrees in a rotation angle of a crankshaft and a signal for every combustion period are output. A water temperature sensor 14 detects a cooling water temperature of the engine. In addition, an accelerator opening sensor 13 detects a stepping-in amount of an accelerator 6 and detects a required torque of a driver by the stepping-in amount.

A signal of each of the accelerator opening sensor 13, the air flow sensor 2, the intake air temperature sensor 29, a throttle opening sensor 17 attached to the electronic throttle 3, the crank angle sensor 15, and the water temperature sensor 14 is transmitted to the control unit 16 to be described below. The control unit 16 obtains a driving state of the engine from sensor outputs and optimally operates an air amount, a fuel injection amount, and ignition timing to be main operation amounts of the engine.

A target air amount operated in the control unit 16 is converted into an electronic throttle drive signal from a target throttle opening and is transmitted to the electronic throttle 3. The fuel injection amount is converted into a valve opening pulse signal and is transmitted to a fuel injection valve (injector) 7. In addition, a drive signal is transmitted to an ignition plug 8 such that the ignition plug 8 ignites at the ignition timing operated by the control unit 16.

An injected fuel is mixed with the air from the intake manifold, flows into the cylinders of the engine 9, and forms an air-fuel mixture. The air-fuel mixture is exploded by sparks generated from the ignition plug 8 at the predetermined ignition timing, presses a piston by a combustion pressure thereof, and becomes power of the engine. Exhaust after explosion is supplied to a three-way catalyst 11 and a particulate filter 36 via the exhaust manifold 10. A part of the exhaust is recirculated to an intake side through an exhaust recirculation pipe 18. A recirculation amount is controlled by an EGR valve 19.

An air-fuel ratio sensor 12 is attached to an exhaust pipe collection portion. A temperature sensor 31, an oxygen concentration sensor 32, and a carbon dioxide concentration sensor 33 are attached to an upstream side of the particulate filter 36. A temperature sensor 20, an oxygen concentration sensor 34, and a carbon dioxide concentration sensor 35 are attached to a downstream side of the particulate filter 36.
(Configuration of Control Unit)

Figure 2:
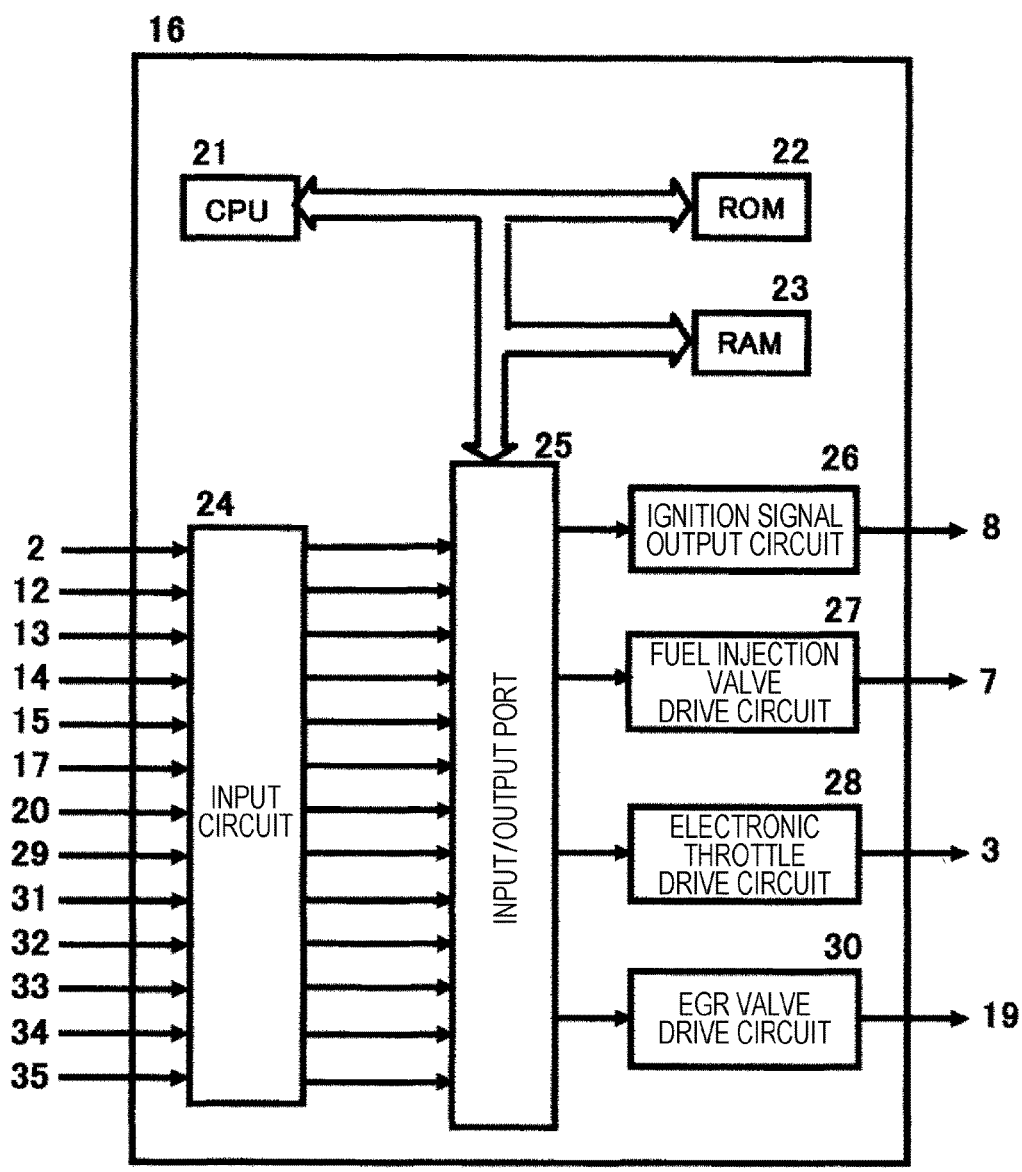
FIG. 2 is a configuration diagram illustrating an inner portion of a control unit illustrated in FIG. 1.

Next, a configuration of the control unit 16 will be described. FIG. 2 is a configuration diagram illustrating an inner portion of the control unit 16 illustrated in FIG. 1.

Individual sensor output values are input from the air flow sensor 2, the air-fuel ratio sensor 12, the accelerator opening sensor 13, the water temperature sensor 14, the crank angle sensor 15, the throttle valve opening sensor 17, the intake air temperature sensor 29, the temperature sensor 31, the oxygen concentration sensor 32, the carbon dioxide concentration sensor 33, the temperature sensor 20, the oxygen concentration sensor 34, and the carbon dioxide concentration sensor 35 to the control unit 16.

The individual sensor output values input to the control unit 16 are subjected to signal processing such as noise removing by an input circuit 24 and are then transmitted to an input/output port 25. A value (value input to the input/output port 25) of an input port is stored in a RAM 23 and is subjected to operation processing in a CPU 21. A control program describing contents (a sequence) of the operation processing is previously written to a ROM 22. A value representing each actuator operation amount operated according to the control program is stored in the RAM 23 and is then transmitted to the input/output port 25.

An ON/OFF signal that becomes ON when at the time of conduction of a primary-side coil in an ignition output circuit and becomes OFF at the time of non-conduction is set as an operation signal of the ignition plug. The ignition timing is when ON changes to OFF. A signal (value output from the input/output port 25) for the ignition plug set to an output port is amplified to sufficient energy necessary for combustion by an ignition signal output circuit 26 and is supplied to the ignition plug.

In addition, an ON/OFF signal that becomes ON at the time of valve opening and becomes OFF at the time of valve closing is set as a drive signal of the fuel injection valve. The drive signal of the fuel injection valve is amplified to energy sufficient for opening the fuel injection valve by a fuel injection valve drive circuit 27 and is transmitted to a fuel injection valve 7. A drive signal to realize a target opening of the electronic throttle 3 is transmitted to the electronic throttle 3 via an electronic throttle drive circuit 28. A drive signal to realize a target opening of the EGR valve 19 is transmitted to the EGR valve 19 via an EGR valve drive circuit 30.

In addition, the input/output port functions as an input unit that receives a signal indicating a state of exhaust gas. The state of the exhaust gas indicates a degree of an oxidation reaction of soot (particulate substances) trapped by the particulate filter 36.

(First Embodiment)

Figure 3:
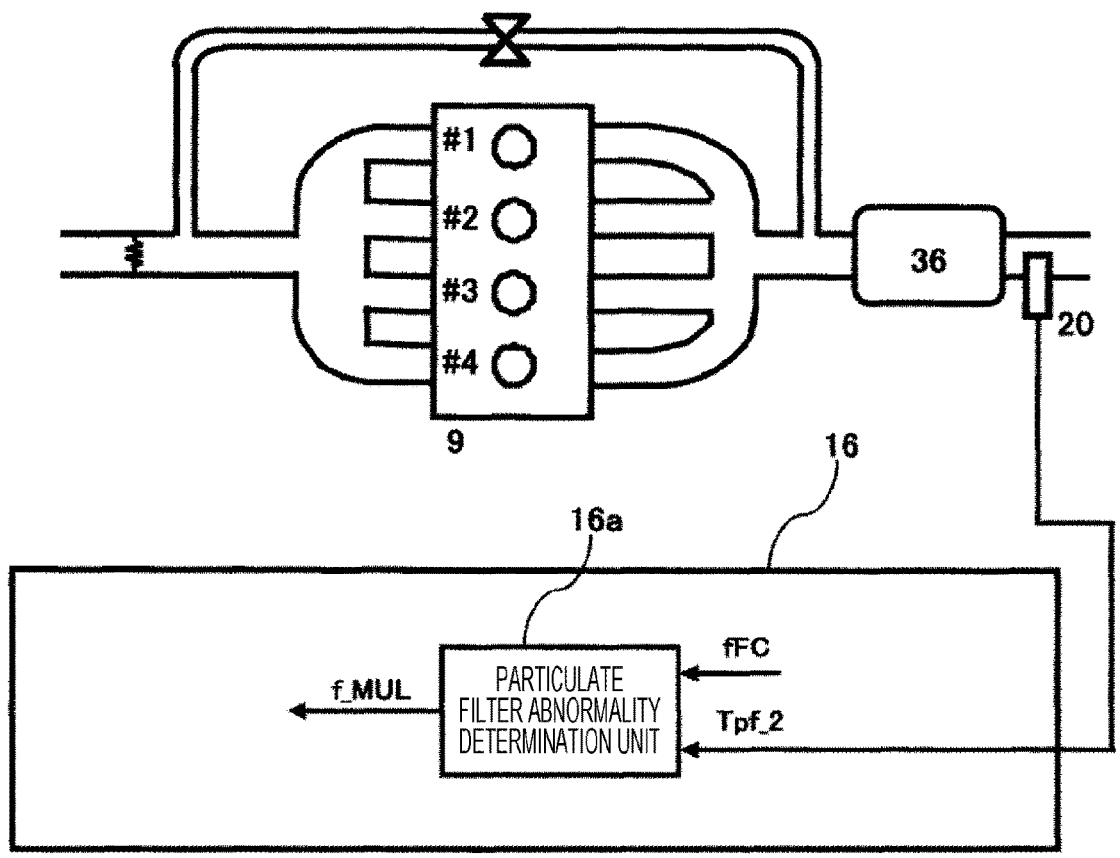
FIG. 3 is a block diagram illustrating a function of a control unit according to first and ninth embodiments of the present invention.
Figure 4:
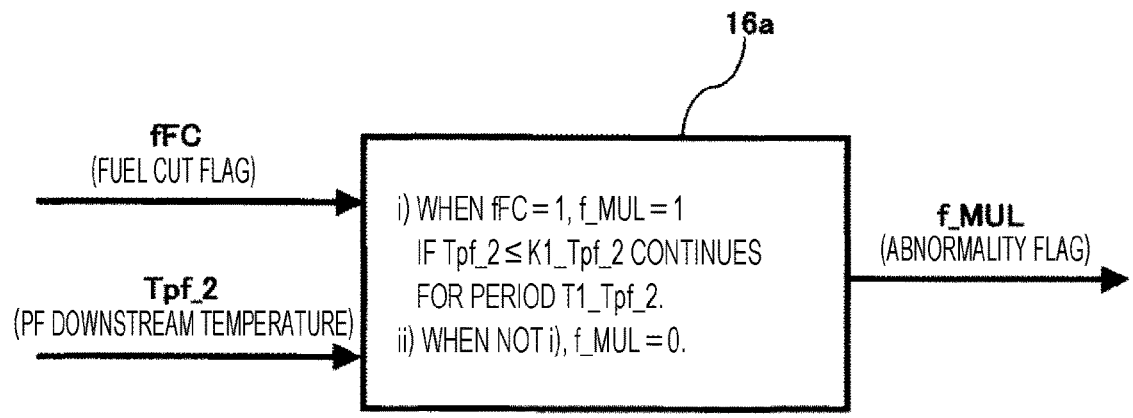
FIG. 4 is a block diagram of a particulate filter abnormality determination unit according to first, tenth, and eleventh embodiments of the present invention.

Next, a function of a control unit 16 will be described using FIGS. 3 and 4. FIG. 3 is a block diagram illustrating a function of a control unit 16 according to a first embodiment of the present invention. FIG. 4 is a detail view of a particulate filter abnormality determination unit 16a illustrated in FIG. 3. The function of the control unit 16 is realized by executing a control program stored in a ROM 22 by a CPU 21.

In this embodiment, the particulate filter abnormality determination unit 16a detects performance abnormality of a particulate filter using an output value of a temperature sensor 20 of a downstream side of the particulate filter at the time of fuel cut. Here, the performance abnormality means a state in which the particulate filter is physically broken like when the particulate filter gets a hole and trap performance of soot is degraded.

As illustrated in FIG. 3, the control unit 16 includes the particulate filter abnormality determination unit 16a. A fuel cut flag fFC and an output value Tpf_2 of the temperature sensor 20 of the downstream side of the particulate filter are input to the particulate filter abnormality determination unit 16a. The particulate filter abnormality determination unit 16a operates an abnormality flag f_MUL indicating whether the particulate filter is abnormal, on the basis of these input values. Here, the fuel cut flag fFC takes a value of 1 at the time of execution of the fuel cut and takes a value of 0 at the time of non-execution.

Specifically, the particulate filter abnormality determination unit 16a sets the abnormality flag f_MUL, as illustrated in FIG. 4. A sequence thereof is as follows.

i) When fFC=1, f_MUL=1 if Tpf_2≤K1_Tpf_2 continues for a period T1_Tpf_2.

ii) When not i), f_MUL=0.

That is, the particulate filter abnormality determination unit 16a turns on (=1) the abnormality flag f_MUL, in the case in which a state in which the temperature sensor output value Tpf_2 indicating the temperature of the downstream side of the particulate filter at the time of the fuel cut (fFC=1) is equal to or smaller than a predetermined threshold value K1_Tpf_2 continues for the predetermined period T1_Tpf_2. The particulate filter abnormality determination unit 16a turns off (=0) the abnormality flag f_MUL in the other case.

If the soot trapped in the particulate filter is combusted (oxidized) when the fuel is cut, an appropriate level of temperature rise occurs in the particulate filter. However, if the particulate filter is degraded, the soot trap amount decreases and the temperature rise in the particulate filter according to combustion of the trapped soot when the fuel is cut decreases. In this embodiment, this phenomenon is detected, so that performance degradation of the particulate filter is detected.

The threshold value K1_Tpf_2 of the temperature and the threshold value T1_Tpf_2 of the period are determined according to target performance of the particulate filter. In addition, the threshold value K1_Tpf_2 of the temperature and the threshold value T1_Tpf_2 of the period are set according to a driving history.

The temperature sensor 20 may be disposed in the particulate filter and may measure an internal temperature. This processing may be executed in a predetermined period from when the fuel cut flag fFC=1 is set and a predetermined time passes, in consideration of transient response. To improve reliability of abnormality determination, when results of the particulate filter abnormality determination become abnormal (f_MUL=1) in both two fuel cuts, the abnormality flag f_MUL=1 may be maintained hereinafter.

As described above, according to this embodiment, the performance degradation of the particulate filter can be detected from the temperature of the downstream side of the particulate filter.

(Second Embodiment)

Figure 5:
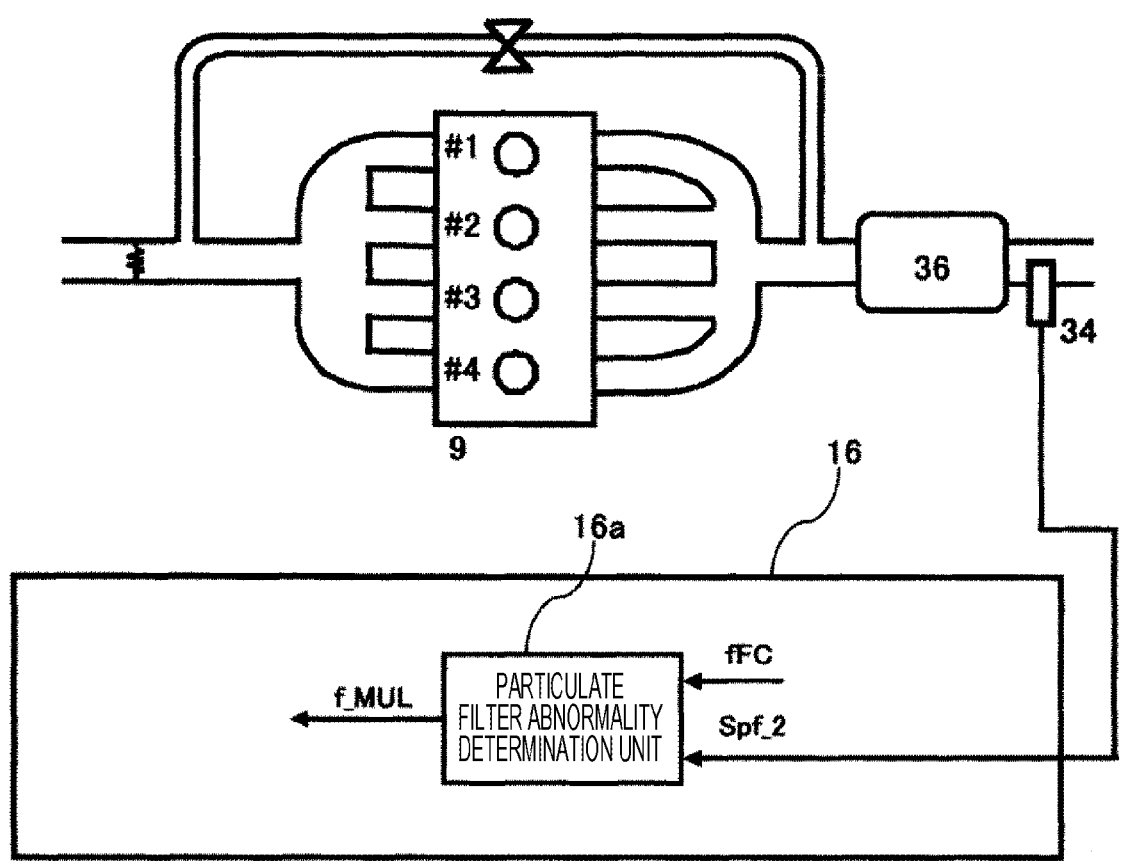
FIG. 5 is a block diagram illustrating a function of a control unit according to a second embodiment of the present invention.
Figure 6:
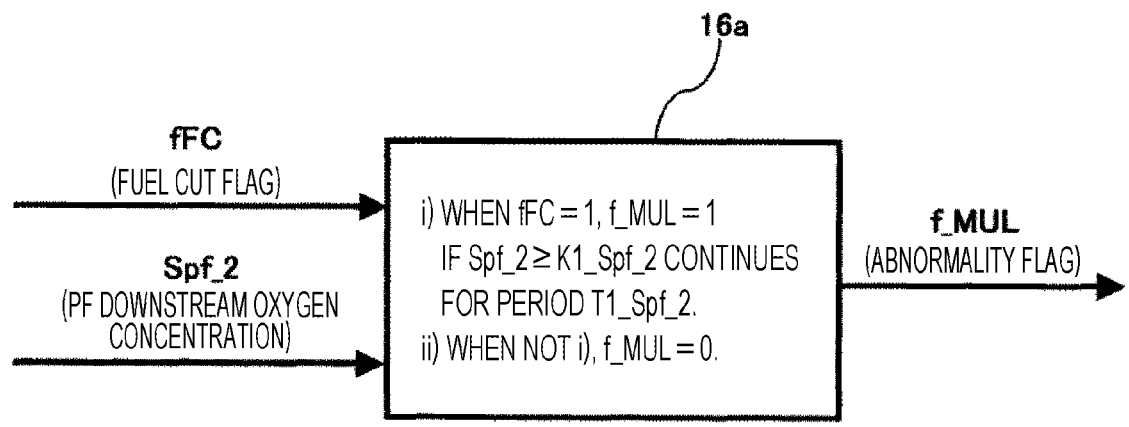
FIG. 6 is a block diagram of a particulate filter abnormality determination unit according to a second embodiment of the present invention.

Next, a function of a control unit 16 will be described using FIGS. 5 and 6. FIG. 5 is a block diagram illustrating a function of a control unit 16 according to a second embodiment of the present invention. FIG. 6 is a detail view of a particulate filter abnormality determination unit 16a illustrated in FIG. 5. A function of the control unit 16 is realized by executing a control program stored in a ROM 22 by a CPU 21.

In this embodiment, the particulate filter abnormality determination unit 16a diagnoses performance degradation (performance abnormality) of a particulate filter using an output value of an oxygen concentration sensor 34 of a downstream side of the particulate filter at the time of fuel cut.

As illustrated in FIG. 5, the control unit 16 includes the particulate filter abnormality determination unit 16a. A fuel cut flag fFC and an output value Spf_2 of the oxygen concentration sensor 34 of the downstream side of the particulate filter are input to the particulate filter abnormality determination unit 16a. The particulate filter abnormality determination unit 16a operates an abnormality flag f_MUL, on the basis of these input values. As described above, the fuel cut flag fFC takes a value of 1 at the time of execution of the fuel cut and takes a value of 0 at the time of non-execution.

Specifically, the particulate filter abnormality determination unit 16a sets the abnormality flag f_MUL, as illustrated in FIG. 6. A sequence thereof is as follows.

i) When fFC=1, f_MUL=1 if Spf_2≥K1_Spf_2 continues for a period T1_Spf_2.

ii) When not i), f_MUL=0.

That is, the particulate filter abnormality determination unit 16a turns on (=1) the abnormality flag f_MUL, in the case in which a state in which the output value Spf_2 of the oxygen concentration sensor 34 of the downstream side of the particulate filter at the time of the fuel cut (fFC=1) is equal to or larger than a predetermined threshold value K1_Spf_2 continues for a predetermined period T1_Spf_2. The particulate filter abnormality determination unit 16a turns off (=0) the abnormality flag f_MUL in the other case.

If soot trapped in the particulate filter is combusted (oxidized) when the fuel is cut, an appropriate level of oxygen concentration decrease occurs in the particulate filter. However, if the particulate filter is degraded, the soot trap amount decreases and the oxygen concentration decrease in the particulate filter according to combustion of the trapped soot when the fuel is cut decreases. In this embodiment, this phenomenon is detected, so that performance degradation of the particulate filter is detected.

The threshold value K1_Spf_2 of the oxygen concentration and the threshold value T1_Spf_2 of the period are determined according to target performance of the particulate filter.

The oxygen concentration sensor 34 may be disposed in the particulate filter and may measure an internal oxygen concentration. Because conversion from an oxygen concentration in exhaust to A/F is executed in an A/F sensor, the A/F sensor may be used. This processing may be executed in a predetermined period from when the fuel cut flag fFC=1 is set and a predetermined time passes, in consideration of transient response. To improve reliability of abnormality determination, when results of the particulate filter abnormality determination become abnormal (f_MUL=1) in both two fuel cuts, the abnormality flag f_MUL=1 may be maintained hereinafter.

As described above, according to this embodiment, the performance degradation of the particulate filter can be detected from the oxygen concentration of the downstream side of the particulate filter.

(Third Embodiment)

Figure 7:
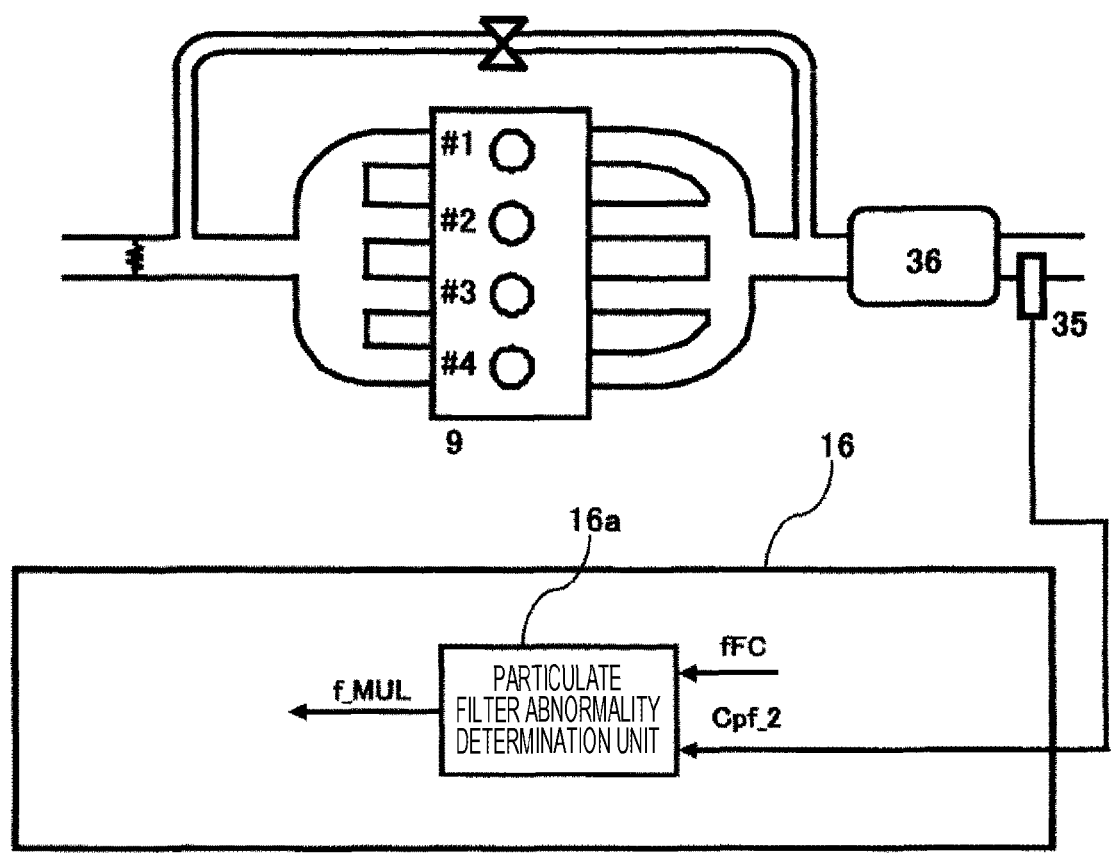
FIG. 7 is a block diagram illustrating a function of a control unit according to a third embodiment of the present invention.
Figure 8:
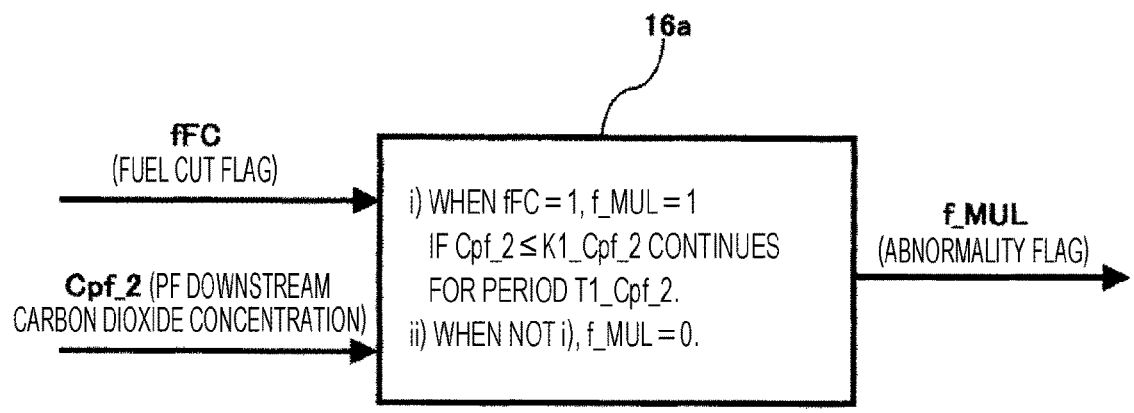
FIG. 8 is a block diagram of a particulate filter abnormality determination unit according to a third embodiment of the present invention.

Next, a function of a control unit 16 will be described using FIGS. 7 and 8. FIG. 7 is a block diagram illustrating a function of a control unit 16 according to a third embodiment of the present invention. FIG. 8 is a detail view of a particulate filter abnormality determination unit 16a illustrated in FIG. 7. A function of the control unit 16 is realized by executing a control program stored in a ROM 22 by a CPU 21.

In this embodiment, the particulate filter abnormality determination unit 16a diagnoses performance degradation of a particulate filter using an output value of a carbon dioxide concentration sensor 35 of a downstream side of the particulate filter at the time of fuel cut.

As illustrated in FIG. 7, the control unit 16 includes the particulate filter abnormality determination unit 16a. A fuel cut flag fFC and an output value Cpf_2 of the carbon dioxide concentration sensor 35 of the downstream side of the particulate filter are input to the particulate filter abnormality determination unit 16a. The particulate filter abnormality determination unit 16a operates an abnormality flag f_MUL, on the basis of these input values. As described above, the fuel cut flag fFC takes a value of 1 at the time of execution of the fuel cut and takes a value of 0 at the time of non-execution.

Specifically, the particulate filter abnormality determination unit 16a sets the abnormality flag f_MUL, as illustrated in FIG. 8. A sequence thereof is as follows.

i) When fFC=1, f_MUL=1 if Cpf_2≤K1_Cpf_2 continues for a period T1_Cpf_2.

ii) When not i), f_MUL=0.

That is, the particulate filter abnormality determination unit 16a turns on (=1) the abnormality flag f_MUL, in the case in which a state in which the output value Cpf_2 of the carbon dioxide concentration sensor 35 of the downstream side of the particulate filter at the time of the fuel cut (fFC=1) is equal to or smaller than a predetermined threshold value K1_Cpf_2 continues for a predetermined period T1_Cpf_2. The particulate filter abnormality determination unit 16a turns off (=0) the abnormality flag f_MUL in the other case.

If soot trapped in the particulate filter is combusted (oxidized) when the fuel is cut, an appropriate level of carbon dioxide concentration increase occurs in the particulate filter. However, if the particulate filter is degraded, the soot trap amount decreases and the carbon dioxide concentration increase in the particulate filter according to combustion of the trapped soot when the fuel is cut decreases. In this embodiment, this phenomenon is detected, so that performance degradation of the particulate filter is detected.

The threshold value K1_Cpf_2 of the carbon dioxide concentration and the threshold value T1_Cpf_2 of the period are determined according to target performance of the particulate filter.

The carbon dioxide concentration sensor 35 may be disposed in the particulate filter and may measure an internal carbon dioxide concentration. This processing may be executed in a predetermined period from when the fuel cut flag fFC=1 is set and a predetermined time passes, in consideration of transient response. To improve reliability of abnormality determination, when results of the particulate filter abnormality determination become abnormal (f_MUL=1) in both two fuel cuts, the abnormality flag f_MUL=1 may be maintained hereinafter.

As described above, according to this embodiment, the performance degradation of the particulate filter can be detected from the carbon dioxide concentration of the downstream side of the particulate filter.

(Fourth Embodiment)

Figure 9:
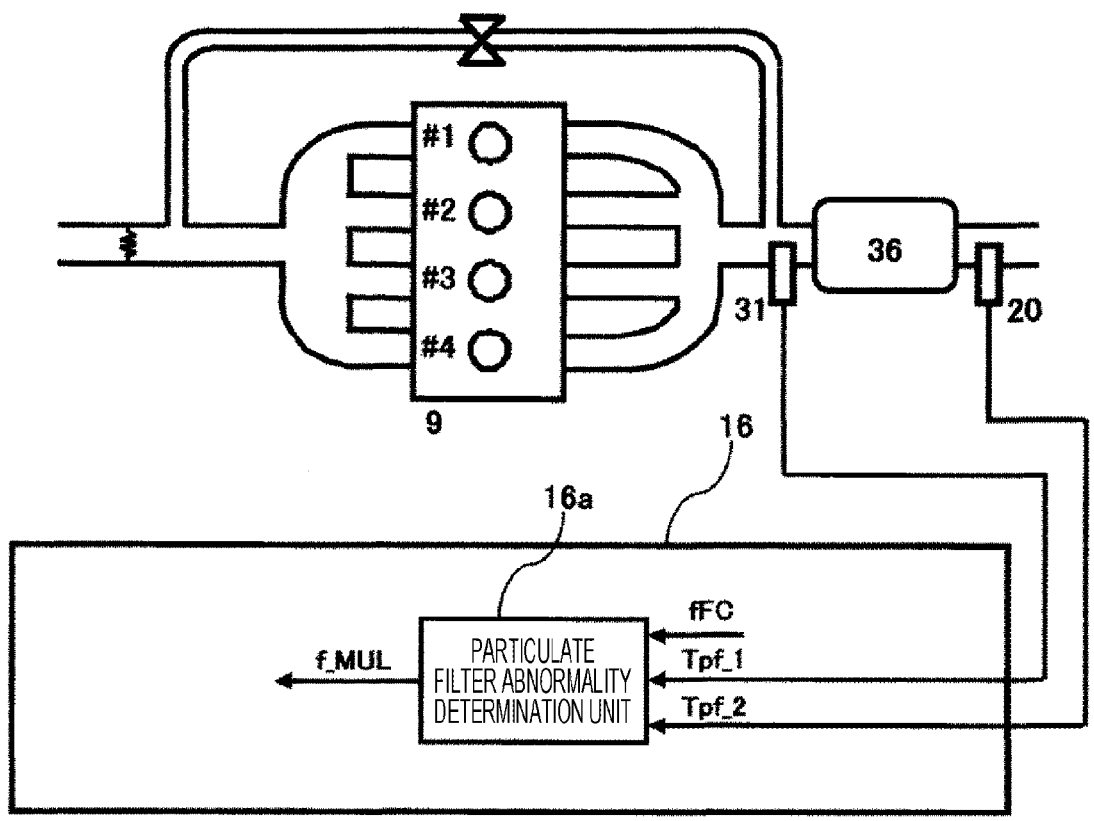
FIG. 9 is a block diagram illustrating a function of a control unit according to fourth and seventh embodiments of the present invention.
Figure 10:
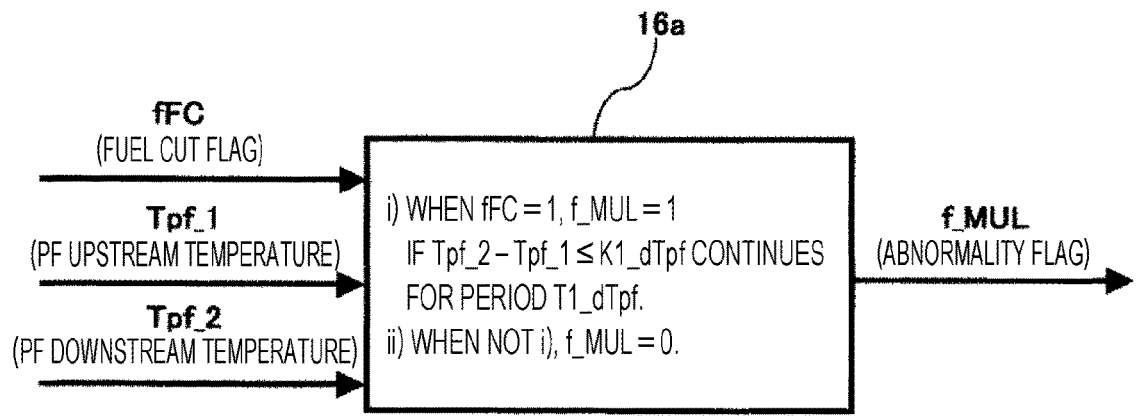
FIG. 10 is a block diagram of a particulate filter abnormality determination unit according to a fourth embodiment of the present invention.

Next, a function of a control unit 16 will be described using FIGS. 9 and 10. FIG. 9 is a block diagram illustrating a function of a control unit 16 according to a fourth embodiment of the present invention. FIG. 10 is a detail view of a particulate filter abnormality determination unit 16a illustrated in FIG. 9. A function of the control unit 16 is realized by executing a control program stored in a ROM 22 by a CPU 21.

In this embodiment, the particulate filter abnormality determination unit 16a diagnoses performance degradation of a particulate filter using an output difference of a temperature sensor 31 of an upstream side of the particulate filter and a temperature sensor 20 of a downstream side of the particulate filter at the time of fuel cut.

As illustrated in FIG. 9, the control unit 16 includes the particulate filter abnormality determination unit 16a. A fuel cut flag fFC, an output value Tpf_1 of the temperature sensor 31 of the upstream side of the particulate filter, and an output value Tpf_2 of the temperature sensor 20 of the downstream side of the particulate filter are input to the particulate filter abnormality determination unit 16a. The particulate filter abnormality determination unit 16a operates an abnormality flag f_MUL, on the basis of these input values. As described above, the fuel cut flag fFC takes a value of 1 at the time of execution of the fuel cut and takes a value of 0 at the time of non-execution.

Specifically, the particulate filter abnormality determination unit 16a sets the abnormality flag f_MUL, as illustrated in FIG. 10. A sequence thereof is as follows.

i) When fFC=1, f_MUL=1 if $Tpf\_2-Tpf\_1 \leq K1\_dTpf$ continues for a period T1_dTpf.

ii) When not i), f_MUL=0.

That is, the particulate filter abnormality determination unit 16a turns on (=1) the abnormality flag f_MUL, in the case in which a state in which an output difference (Tpf_2–Tpf_1) of the output value Tpf_2 of the temperature sensor 20 of the downstream side of the particulate filter and the output value Tpf_1 of the temperature sensor 31 of the upstream side of the particulate filter at the time of the fuel cut (fFC=1) is equal to or smaller than a predetermined threshold value K1_dTpf continues for a predetermined period T1_dTpf. The particulate filter abnormality determination unit 16a turns off (=0) the abnormality flag f_MUL in the other case.

If soot trapped in the particulate filter is combusted (oxidized) when the fuel is cut, an appropriate level of temperature rise occurs in the particulate filter. As a result, a temperature difference occurs in the upstream side and the downstream side of the particulate filter. However, if the particulate filter is degraded, the soot trap amount decreases and the temperature difference in the upstream side and the downstream side of the particulate filter according to combustion of the trapped soot when the fuel is cut decreases. In this embodiment, this phenomenon is detected, so that performance degradation of the particulate filter is detected.

The threshold value K1_dTpf of the difference of the temperature and the threshold value T1_dTpf of the period are determined according to target performance of the particulate filter.

The temperature sensor 20 may be disposed in the particulate filter and may measure an internal temperature. This processing may be executed in a predetermined period from when the fuel cut flag fFC=1 is set and a predetermined time passes, in consideration of transient response. To improve reliability of abnormality determination, when results of the particulate filter abnormality determination become abnormal (f_MUL=1) in both two fuel cuts, the abnormality flag f_MUL=1 may be maintained hereinafter.

As described above, according to this embodiment, the performance degradation of the particulate filter can be detected from the temperature difference of the downstream side and the upstream side of the particulate filter.

(Fifth Embodiment)

Figure 11:
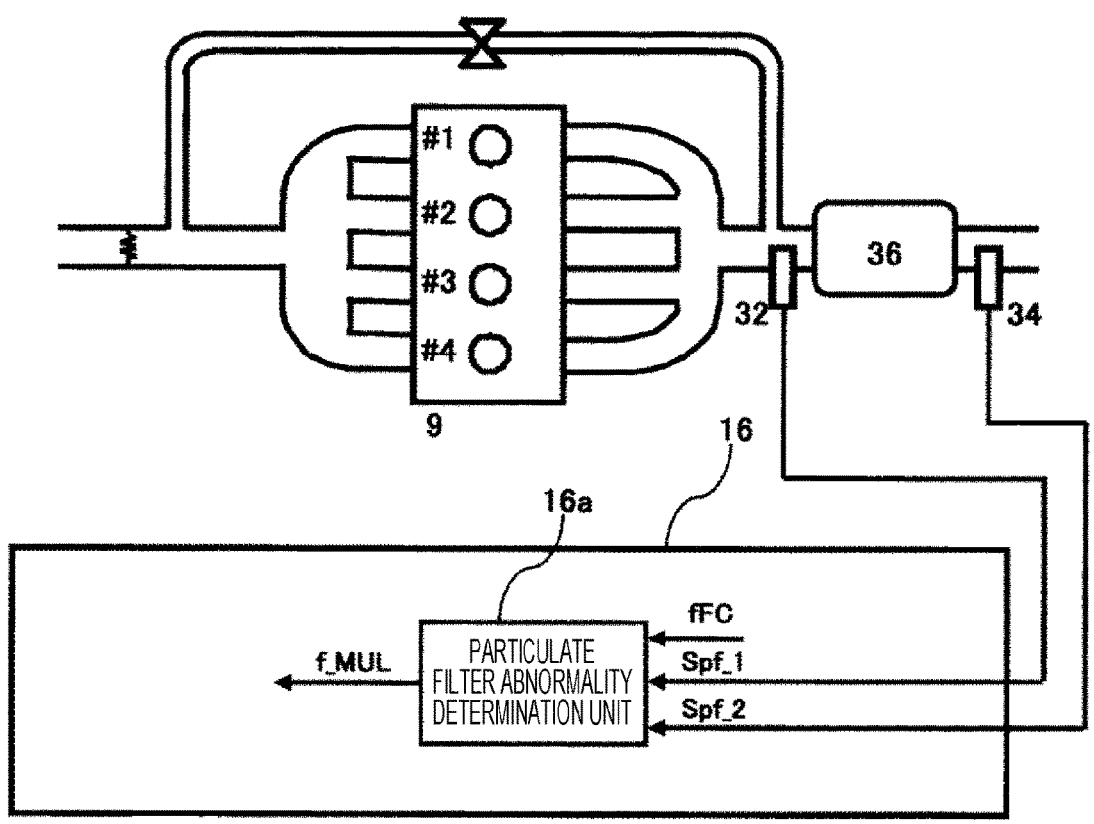
FIG. 11 is a block diagram illustrating a function of a control unit according to a fifth embodiment of the present invention.
Figure 12:
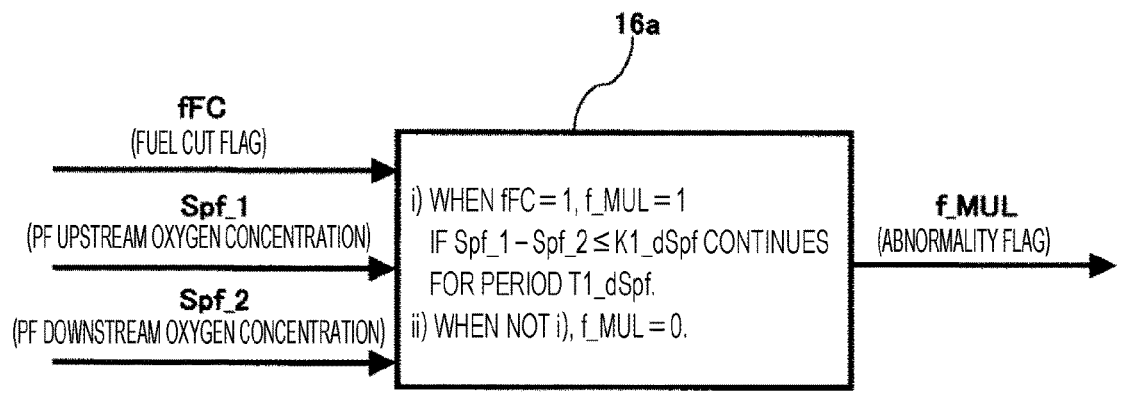
FIG. 12 is a block diagram of a particulate filter abnormality determination unit according to a fifth embodiment of the present invention.

Next, a function of a control unit 16 will be described using FIGS. 11 and 12. FIG. 11 is a block diagram illustrating a function of a control unit 16 according to a fifth embodiment of the present invention. FIG. 12 is a detail view of a particulate filter abnormality determination unit 16a illustrated in FIG. 11. A function of the control unit 16 is realized by executing a control program stored in a ROM 22 by a CPU 21.

In this embodiment, the particulate filter abnormality determination unit 16a diagnoses performance abnormality of a particulate filter using an output difference of an oxygen concentration sensor 32 of an upstream side of the particulate filter and an oxygen concentration sensor 34 of a downstream side of the particulate filter at the time of fuel cut.

As illustrated in FIG. 11, the control unit 16 includes the particulate filter abnormality determination unit 16a. A fuel cut flag fFC, an output value Spf_1 of the oxygen concentration sensor 32 of the upstream side of the particulate filter, and an output value Spf_2 of the oxygen concentration sensor 34 of the downstream side of the particulate filter are input to the particulate filter abnormality determination unit 16a. The particulate filter abnormality determination unit 16a operates an abnormality flag f_MUL, on the basis of these input values. As described above, the fuel cut flag fFC takes a value of 1 at the time of execution of the fuel cut and takes a value of 0 at the time of non-execution.

Specifically, the particulate filter abnormality determination unit 16a sets the abnormality flag f_MUL, as illustrated in FIG. 12. A sequence thereof is as follows.

i) When fFC=1, f_MUL=1 if $Spf\_1-Spf\_2 \leq K1\_dSpf$ continues for a period T1_dSpf.

ii) When not i), f_MUL=0.

That is, the particulate filter abnormality determination unit 16a turns on (=1) the abnormality flag f_MUL, in the case in which a state in which an output difference (Spf_1–Spf_2) of the output value Spf_1 of the oxygen concentration sensor 32 of the upstream side of the particulate filter and the output value Spf_2 of the oxygen concentration sensor 34 of the downstream side of the particulate filter at the time of the fuel cut (fFC=1) is equal to or smaller than the predetermined threshold value K1_dSpf continues for a predetermined period T1_dSpf. The particulate filter abnormality determination unit 16a turns off (=0) the abnormality flag f_MUL in the other case.

If soot trapped in the particulate filter is combusted (oxidized) when the fuel is cut, an appropriate level of oxygen concentration decrease occurs in the particulate filter. As a result, an oxygen concentration difference occurs in the upstream side and the downstream side of the particulate filter. However, if the particulate filter is degraded, the soot trap amount decreases and the oxygen concentration difference in the upstream side and the downstream side of the particulate filter according to combustion of the trapped soot when the fuel is cut decreases. In this embodiment, this phenomenon is detected, so that performance degradation of the particulate filter is detected.

The threshold value K1_dSpf of the difference of the oxygen concentrations and the threshold value T1_dSpf of the period are determined according to target performance of the particulate filter.

The oxygen concentration sensor 34 may be disposed in the particulate filter and may measure an internal oxygen concentration. Because conversion from an oxygen concentration of exhaust to A/F is executed in an A/F sensor, the A/F sensor may be used. This processing may be executed in a predetermined period from when the fuel cut flag fFC=1 is set and a predetermined time passes, in consideration of transient response. To improve reliability of abnormality determination, when results of the particulate filter abnormality determination become abnormal (f_MUL=1) in both two fuel cuts, the abnormality flag f_f_MUL=1 may be maintained hereinafter.

As described above, according to this embodiment, the performance degradation of the particulate filter can be detected from the oxygen concentration difference of the downstream side and the upstream side of the particulate filter.

(Sixth Embodiment)

Figure 13:
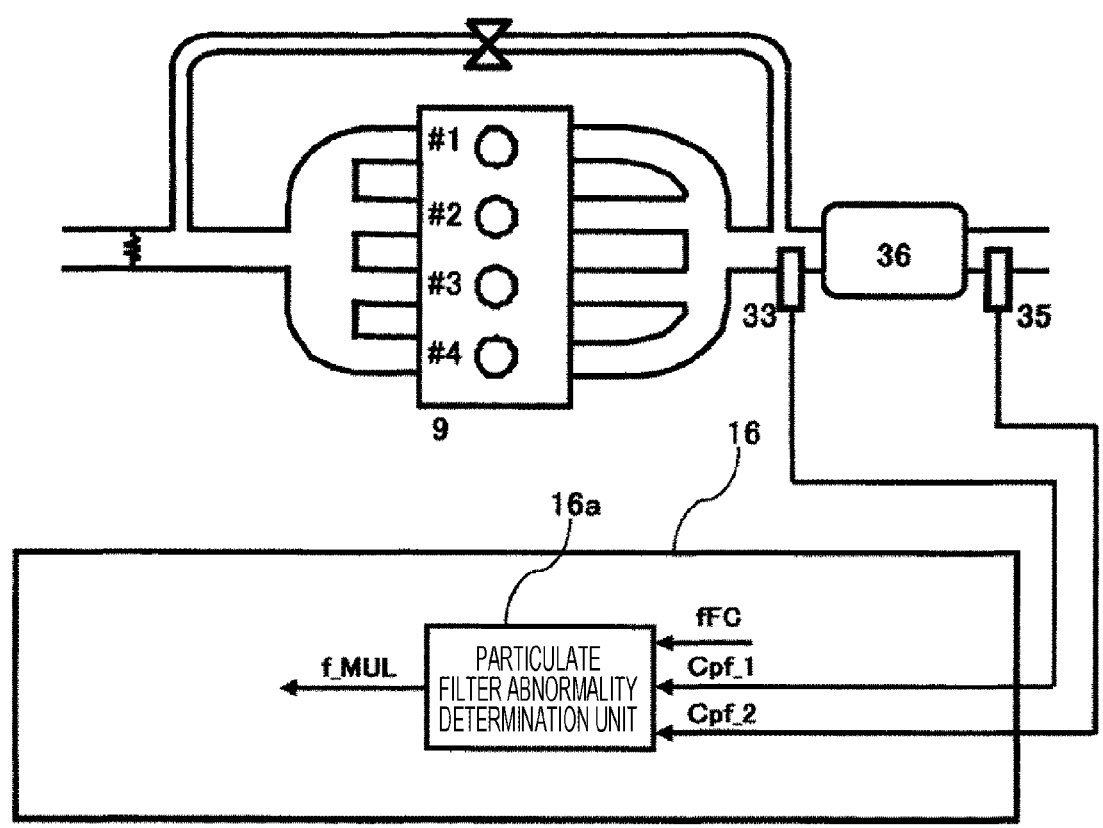
FIG. 13 is a block diagram illustrating a function of a control unit according to a sixth embodiment of the present invention.
Figure 14:
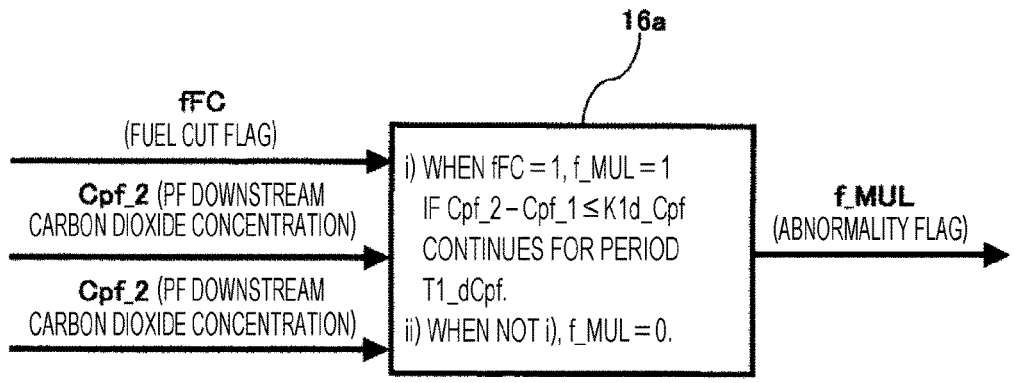
FIG. 14 is a block diagram of a particulate filter abnormality determination unit according to a sixth embodiment of the present invention.

Next, a function of a control unit 16 will be described using FIGS. 13 and 14. FIG. 13 is a block diagram illustrating a function of a control unit 16 according to a sixth embodiment of the present invention. FIG. 14 is a detail view of a particulate filter abnormality determination unit 16a illustrated in FIG. 13. A function of the control unit 16 is realized by executing a control program stored in a ROM 22 by a CPU 21.

In this embodiment, the particulate filter abnormality determination unit 16a diagnoses performance degradation of a particulate filter using an output difference of a carbon dioxide concentration sensor 33 of an upstream side of the particulate filter and a carbon dioxide concentration sensor 35 of a downstream side of the particulate filter at the time of fuel cut.

As illustrated in FIG. 13, the control unit 16 includes the particulate filter abnormality determination unit 16a. A fuel cut flag fFC, an output value Cpf_1 of the carbon dioxide concentration sensor 33 of the upstream side of the particulate filter, and an output value Cpf_2 of the carbon dioxide concentration sensor 35 of the downstream side of the particulate filter are input to the particulate filter abnormality determination unit 16a. The particulate filter abnormality determination unit 16a operates an abnormality flag f_MUL, on the basis of these input values. As described above, the fuel cut flag fFC takes a value of 1 at the time of execution of the fuel cut and takes a value of 0 at the time of non-execution.

Specifically, the particulate filter abnormality determination unit 16a sets the abnormality flag f_MUL, as illustrated in FIG. 14. A sequence thereof is as follows.

i) When fFC=1, f_MUL=1 if Cpf_2−Cpf_1≤K1_dCpf continues for a period T1_dCpf.

ii) When not i), f_MUL=0.

That is, the particulate filter abnormality determination unit 16a turns on (=1) the abnormality flag f_MUL, in the case in which a state in which an output difference (Cpf_2−Cpf_1) of the output value Cpf_2 of the carbon dioxide concentration sensor 35 of the downstream side of the particulate filter and the output value Cpf_1 of the carbon dioxide concentration sensor 33 of the upstream side of the particulate filter at the time of the fuel cut (fFC=1) is equal to or smaller than a predetermined threshold value K1_dCpf continues for a predetermined period T1_dCpf. The particulate filter abnormality determination unit 16a turns off (=0) the abnormality flag f_MUL in the other case.

If soot trapped in the particulate filter is combusted (oxidized) when the fuel is cut, an appropriate level of carbon dioxide increase occurs in the particulate filter. As a result, a carbon dioxide concentration difference occurs in the downstream side and the upstream side of the particulate filter. However, if the particulate filter is degraded, the soot trap amount decreases and the carbon dioxide concentration difference in the downstream side and the upstream side of the particulate filter according to combustion of the trapped soot when the fuel is cut decreases. In this embodiment, this phenomenon is detected, so that performance degradation of the particulate filter is detected.

The threshold value K1_dCpf of the difference of the carbon dioxide concentrations and the threshold value T1_dCpf of the period are determined according to target performance of the particulate filter.

The carbon dioxide concentration sensor 35 may be disposed in the particulate filter and may measure an internal carbon dioxide concentration. This processing may be executed in a predetermined period from when the fuel cut flag fFC=1 is set and a predetermined time passes, in consideration of transient response. To improve reliability of abnormality determination, when results of the particulate filter abnormality determination become abnormal (f_MUL=1) in both two fuel cuts, the abnormality flag f_MUL=1 may be maintained hereinafter.

As described above, according to this embodiment, the performance degradation of the particulate filter can be detected from the carbon dioxide concentration difference of the downstream side and the upstream side of the particulate filter.

(Seventh Embodiment)

Figure 15:
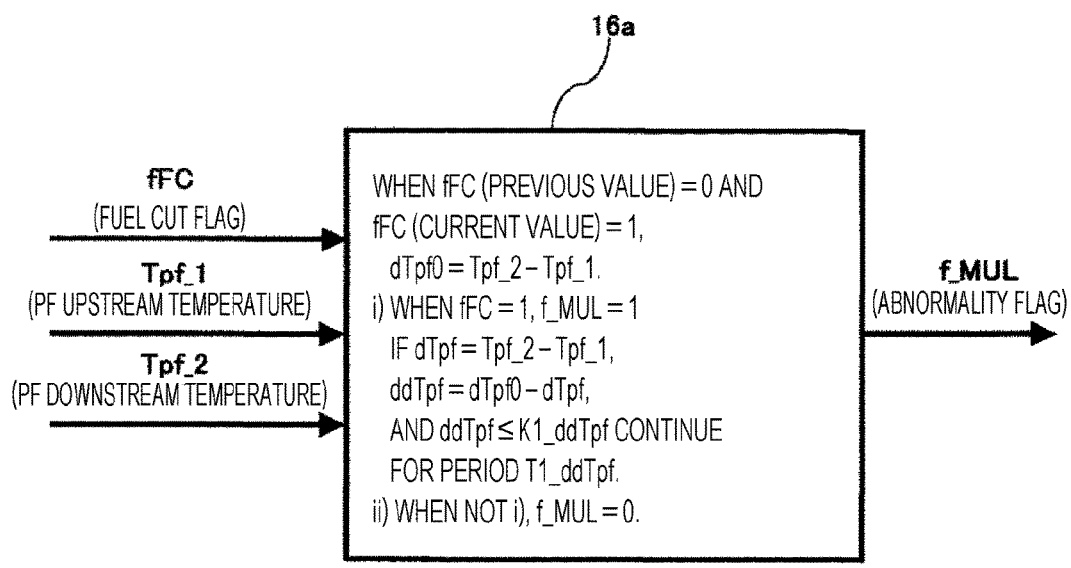
FIG. 15 is a block diagram of a particulate filter abnormality determination unit according to a seventh embodiment of the present invention.

Next, a function of a control unit 16 will be described using FIG. 15. FIG. 15 is a detail view of a particulate filter abnormality determination unit 16a. A function of the control unit 16 is realized by executing a control program stored in a ROM 22 by a CPU 21.

In this embodiment, the particulate filter abnormality determination unit 16a diagnoses performance abnormality of a particulate filter, using a difference of an initial value to be a temperature difference of an upstream side and a downstream side when fuel cut conditions are realized and a temperature difference of the upstream side and the downstream side.

Similar to the fourth embodiment illustrated in FIG. 9, a fuel cut flag fFC, an output value Tpf_1 of a temperature sensor 31 of the upstream side of the particulate filter, and an output value Tpf_2 of a temperature sensor 20 of the downstream side of the particulate filter are input to the particulate filter abnormality determination unit 16a. The particulate filter abnormality determination unit 16a operates an abnormality flag f_MUL, on the basis of these input values. As described above, the fuel cut flag fFC takes a value of 1 at the time of execution of the fuel cut and takes a value of 0 at the time of non-execution.

Specifically, the particulate filter abnormality determination unit 16a sets the abnormality flag f_MUL, as illustrated in FIG. 15. A sequence thereof is as follows.

When fFC (previous value)=0 and fFC (current value)=1, dTpf0=Tpf_2−Tpf_1.

i) When fFC=1, f_MUL=1 if dTpf=Tpf_2−Tpf_1, ddTpf=dTpf0−dTpf, and ddTpf≤K1_ddTpf continue for a period T1_ddTpf.

ii) When not i), f_MUL=0.

That is, the particulate filter abnormality determination unit 16a turns on (=1) the abnormality flag f_MUL, in the case in which a state in which a difference ddTpf of an output difference (Tpf_2−Tpf_1) of the output value Tpf_2 of the temperature sensor 20 of the downstream side of the particulate filter and the output value Tpf_1 of the temperature sensor 31 of the upstream side of the particulate filter at start timing (fFC: 0−>1) of the fuel cut and an output difference (Tpf_2−Tpf_1) at predetermined timing during the fuel cut (fFC=1) is equal to or smaller than a predetermined threshold value K1_ddTpf continues for a predetermined period T1_ddTpf. The particulate filter abnormality determination unit 16a turns off (=0) the abnormality flag f_MUL in the other case.

As described above, if soot trap performance of the particulate filer is degraded, the soot trap amount decreases and the temperature difference in the upstream side and the downstream side of the particulate filter according to combustion of the trapped soot when the fuel is cut decreases. A profile of the temperature difference changes according to the temperature difference of the particulate filter immediately before the fuel cut.

In this embodiment, to decrease an influence thereof, performance degradation of the particulate filter is detected on the basis of the difference ddTpf of the temperature difference dTpf0 at the start timing of the fuel cut and the temperature difference dTpf at the predetermined timing during the fuel cut.

Here, when performance of the particulate filter is degraded (when the trapped soot amount decreases), ddTpf tends to decrease. In this embodiment, this phenomenon is detected, so that the performance degradation of the particulate filter is detected.

The threshold value K1_ddTpf of the difference for the difference of the temperatures and the threshold value T1_ddTpf of the period are determined according to target performance of the particulate filter.

The temperature sensor 20 may be disposed in the particulate filter and may measure an internal temperature. This processing may be executed in a predetermined period from when the fuel cut flag fFC=1 is set and a predetermined time passes, in consideration of transient response. To improve reliability of abnormality determination, when results of the particulate filter abnormality determination become abnormal (f_MUL=1) in both two fuel cuts, the abnormality flag f_MUL=1 may be maintained hereinafter.

As described above, according to this embodiment, the performance degradation of the particulate filter can be detected from the difference of the temperature differences of the downstream side and the upstream side of the particulate filter. In addition, an influence of the profile of the temperature difference can be decreased.

(Eighth Embodiment)

Figure 16:
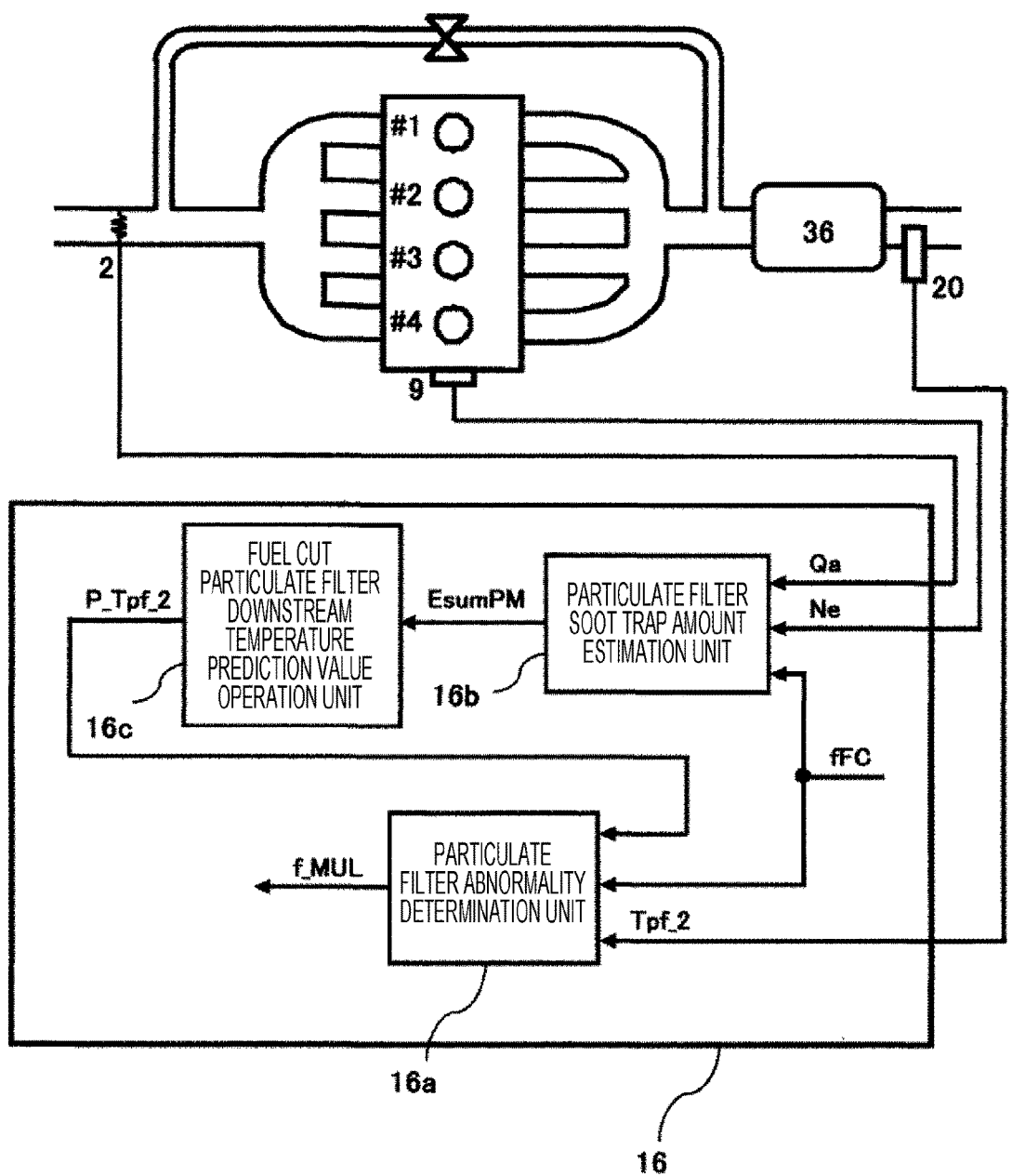
FIG. 16 is a block diagram illustrating a function of a control unit according to an eighth embodiment of the present invention.

Next, a function of a control unit 16 will be described using FIGS. 16 to 19. FIG. 16 is a block diagram illustrating a function of a control unit 16 according to an eighth embodiment of the present invention.

Figure 17:
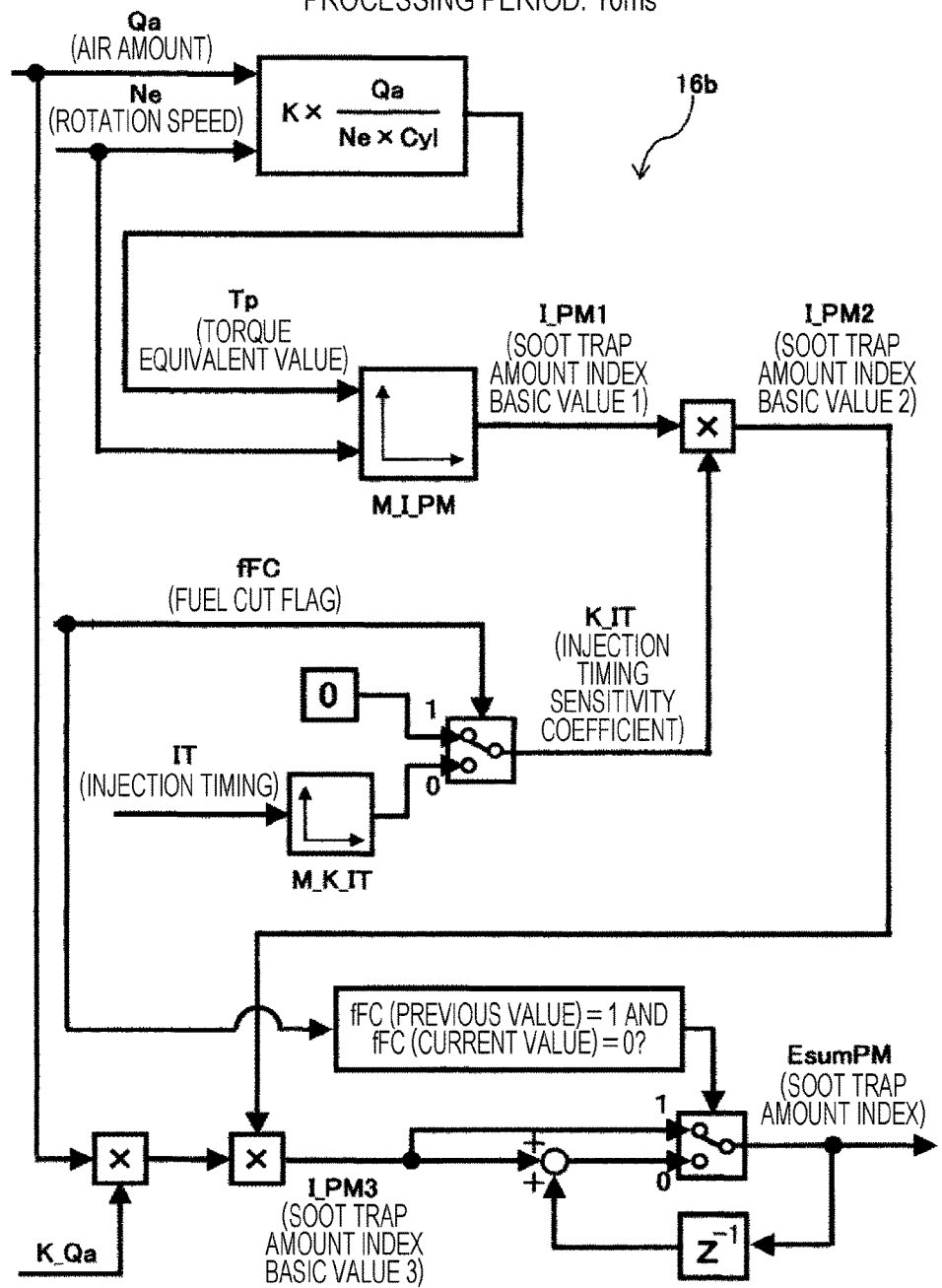
FIG. 17 is a block diagram of a particulate filter soot trap amount estimation unit according to an eighth embodiment of the present invention.
Figure 18:
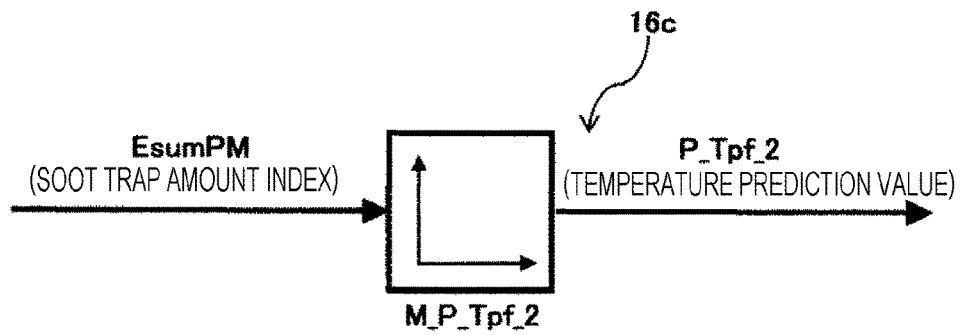
FIG. 18 is a block diagram of a fuel cut particulate filter downstream temperature prediction value operation unit according to an eighth embodiment of the present invention.
Figure 19:
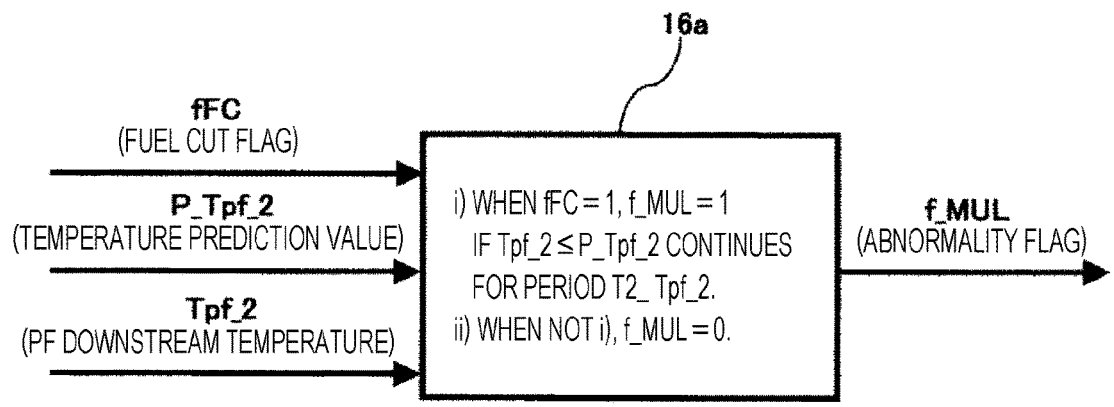
FIG. 19 is a block diagram of a particulate filter abnormality determination unit according to an eighth embodiment of the present invention.

FIG. 17 is a detail view of a particulate filter soot trap amount estimation unit 16b illustrated in FIG. 16. FIG. 18 is a detail view of a fuel cut particulate filter downstream temperature prediction value operation unit 16c illustrated in FIG. 16. FIG. 19 is a detail view of a particulate filter abnormality determination unit 16a illustrated in FIG. 16. A function of the control unit 16 is realized by executing a control program stored in a ROM 22 by a CPU 21.

In this embodiment, the particulate filter abnormality determination unit 16a diagnoses performance abnormality of a particulate filter, on the basis of a prediction value of a degree of an oxidation reaction occurring in the particulate filter at the time of fuel cut and a detection value of a degree of an oxidation reaction occurring in actuality.

Here, a temperature at the time of the oxidation reaction is predicted as the prediction value of the degree of the oxidation reaction, on the basis of an estimation value of an amount of soot trapped in the particulate filter. An output value of a temperature sensor of a downstream side of the particulate filter is used as the detection value of the degree of the oxidation reaction.

As illustrated in FIG. 16, the control unit 16 includes the particulate filter abnormality determination unit 16a, the particulate filter soot trap amount estimation unit 16b, and the fuel cut particulate filter downstream temperature prediction value operation unit 16c.

A fuel cut flag fFC, an air amount Qa, and a rotation speed Ne are input to the particulate filter soot trap amount estimation unit 16b. The particulate filter soot trap amount estimation unit 16b operates a soot trap amount index EsumPM, on the basis of these input values.

The soot trap amount index EsumPM is input to the fuel cut particulate filter downstream temperature prediction value operation unit 16c. The fuel cut particulate filter downstream temperature prediction value operation unit 16c operates a temperature prediction value P_Tpf_2, on the basis of an input value.

The temperature prediction value P_Tpf_2, the fuel cut flag fFC, and an output value Tpf_2 of a temperature sensor 20 of a downstream side of the particulate filter are input to the particulate filter abnormality determination unit 16a. The particulate filter abnormality determination unit 16a operates an abnormality flag f_MUL, on the basis of these input values. As described above, the fuel cut flag fFC takes a value of 1 at the time of execution of the fuel cut and takes a value of 0 at the time of non-execution.

As illustrated in FIG. 17, the particulate filter soot trap amount estimation unit 16b acquires a torque equivalent value Tp from the air amount Qa and the rotation speed Ne using the following formula.

$$K \times Qa/(Ne \times Cyl)$$

Here, K indicates a coefficient for a calibration for conversion into the torque equivalent value and Cyl indicates a cylinder number of an engine. The particulate filter soot trap amount estimation unit 16b refers to a map M_I_PM and acquires a first soot trap amount index basic value I_PM1 from the torque equivalent value Tp and the rotation speed Ne. The map M_I_PM represents an emission amount of soot per unit air flow rate for each driving condition of the engine. A setting value may be determined from an experiment.

The particulate filter soot trap amount estimation unit 16b multiplies the first soot trap amount index basic value I_PM1 with an injection timing sensitivity coefficient K_IT and acquires a second soot trap amount index basic value I_PM2. Here, the injection timing sensitivity coefficient K_IT is 0 in the case of a fuel cut flag fFC=0 and is a value acquired from injection timing IT by referring to a map M_K_IT, in the case of the fuel cut flag fFC=1. The map M_K_IT represents soot emission amount sensitivity for the injection timing. A setting value may be determined from an experiment.

The particulate filter soot trap amount estimation unit 16b multiplies the second soot trap amount index basic value I_PM2 with the air amount Qa and the coefficient K_Qa and acquires a third soot trap amount index basic value I_PM3. The coefficient K_Qa is a coefficient that is changed (converted) from the unit air flow rate to an air flow rate of this processing period unit.

The particulate filter soot trap amount estimation unit 16b operates the soot trap amount index EsumPM from the third soot trap amount index basic value I_PM3, as described below.

i) When fuel cut flag fFC (previous value)=1 and fuel cut flag fFC (current value)=0, ii) EsumPM (soot trap amount index)=I_PM3 (third soot trap amount index basic value).

ii) When not i), EsumPM (soot trap amount index)= EsumPM (previous value)+I_PM3 (third soot trap amount index basic value).

As illustrated in FIG. 18, the fuel cut particulate filter downstream temperature prediction value operation unit 16c refers to a map M_P_Tpf_2 and acquires a temperature prediction value P_Tpf_2 from the soot trap amount index EsumPM. The map M_P_Tpf_2 may be acquired from an experiment.

As illustrated in FIG. 19, the particulate filter abnormality determination unit 16a sets the abnormality flag f_MUL. A sequence thereof is as follows.

i) When fFC=1, f_MUL=1 if $Tpf\_2 \leq P\_Tpf\_2$ continues for a period T2_Tpf_2.

ii) When not i), f_MUL=0.

That is, the particulate filter abnormality determination unit 16a turns on (=1) the abnormality flag f_MUL, in the case in which a state in which the output value Tpf_2 of the temperature sensor 20 of the downstream side of the particulate filter at the time of the fuel cut (fFC=1) is equal to or smaller than the temperature prediction value P_Tpf_2 continues for the predetermined period T2_Tpf_2. The particulate filter abnormality determination unit 16a turns off (=0) the abnormality flag f_MUL in the other case.

The threshold value T2_Tpf_2 of the period is determined according to target performance of the particulate filter.

The temperature sensor 20 may be disposed in the particulate filter and may measure an internal temperature. This processing may be executed in a predetermined period from when the fuel cut flag fFC=1 is set and a predetermined time passes, in consideration of transient response. Processing when the fuel cut flag fFC=1 may set the abnormality flag f_MUL=1 when (maximum value of $Tpf\_2) \leq P\_Tpf\_2$. To improve reliability of abnormality determination, when results of the particulate filter abnormality determination become abnormal (f_MUL=1) in both two fuel cuts, the abnormality flag f_MUL=1 may be maintained hereinafter.

As described above, according to this embodiment, the performance degradation of the particulate filter can be detected from the measurement value and the prediction value of the temperature of the downstream side of the particulate filter.

In this embodiment, the temperature of the downstream side of the particulate filter is predicted. However, a carbon dioxide concentration and an oxygen concentration may be predicted.

(Ninth Embodiment)

Figure 20:
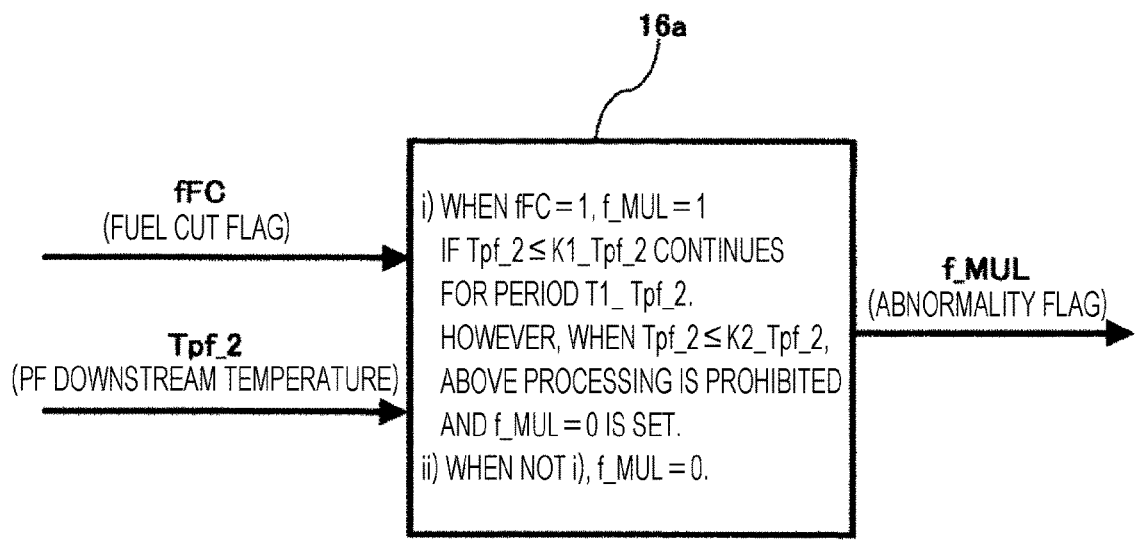
FIG. 20 is a block diagram of a particulate filter abnormality determination unit according to a ninth embodiment of the present invention.

Next, a function of a control unit 16 will be described using FIG. 20. FIG. 20 is a detail view of a particulate filter abnormality determination unit 16a. A function of the control unit 16 is realized by executing a control program stored in a ROM 22 by a CPU 21.

This embodiment corresponds to a modification of the first embodiment. In this embodiment, as compared with the first embodiment, the particulate filter abnormality determination unit 16a prohibits detection of performance degradation when a temperature of the particulate filter is equal to or smaller than the predetermined threshold value K2_Tpf_2 smaller than the threshold value K1_Tpf_2.

As illustrated in FIG. 20, a fuel cut flag fFC and an output value Tpf_2 of a temperature sensor 20 of a downstream side of the particulate filter are input to the particulate filter abnormality determination unit 16a. The particulate filter abnormality determination unit 16a operates an abnormality flag f_MUL, on the basis of these input values. As described above, the fuel cut flag fFC takes a value of 1 at the time of execution of the fuel cut and takes a value of 0 at the time of non-execution.

Specifically, the particulate filter abnormality determination unit 16a sets the abnormality flag f_MUL, as illustrated in FIG. 20. A sequence thereof is as follows.

i) When fFC=1, f_MUL=1 if $Tpf\_2 \leq K1\_Tpf\_2$ continues for a period T1_Tpf_2.

However, when $Tpf\_2 \leq K2\_Tpf\_2$, the above processing is prohibited and f_MUL=0 is set.

ii) When not i), f_MUL=0.

That is, the particulate filter abnormality determination unit 16a turns on (=1) the abnormality flag f_MUL, in the case in which a state in which a temperature sensor output value Tpf_2 indicating the temperature of the downstream side of the particulate filter at the time of the fuel cut (fFC=1) is equal to or smaller than the predetermined threshold value K1_Tpf_2 and is larger than the predetermined threshold value K2_Tpf_2 continues for a predetermined period T1_Tpf_2. The particulate filter abnormality determination unit 16a turns off (=0) the abnormality flag f_MUL, when the temperature sensor output value Tpf_2 indicating the temperature of the downstream side of the particulate filter is equal to or smaller than the predetermined threshold value K2_Tpf_2. The particulate filter abnormality determination unit 16a turns off (=0) the abnormality flag f_MUL in the other case.

As described above, oxygen and a temperature are necessary to combust soot trapped in the particulate filter. Even in a spark ignition engine, the temperature of the particulate filter may be less than a temperature necessary for combusting the trapped soot, according to a driving state.

In this embodiment, in the case in which the temperature of the downstream side of the particulate filter is equal to or smaller than the predetermined value, it is determined that combustion (oxidization) of the trapped soot is not sufficiently advanced and detection of performance degradation of the particulate filter is prohibited even when the fuel is cut. This is because it may be erroneously detected that performance is degraded, even when the particulate filter is normal.

The threshold value K1_Tpf_2 of the temperature and the threshold value T1_Tpf_2 of the period are determined according to target performance of the particulate filter. The threshold value K2_Tpf_2 of the temperature is determined according to a temperature where the soot trapped in the particulate filter can be combusted.

The temperature sensor 20 may be disposed in the particulate filter and may measure an internal oxygen concentration. This processing may be executed in a predetermined period from when the fuel cut flag fFC=1 is set and a predetermined time passes, in consideration of transient response.

To improve reliability of abnormality determination, when results of the particulate filter abnormality determination become abnormal (f_MUL=1) in both two fuel cuts, the abnormality flag f_MUL=1 may be maintained hereinafter. As a temperature when permission of diagnosis of the particulate filter is determined, an estimation value may be used.

An amount of trapped soot may be estimated on the basis of histories (rotation speed, torque, injection timing, division injection number of times, and fuel injection pressure) of parameters for the driving state of the engine.

As described above, according to this embodiment, the performance degradation of the particulate filter can be detected from the temperature of the downstream side of the particulate filter. In addition, the erroneous detection can be suppressed.

(Tenth Embodiment)

Figure 21:
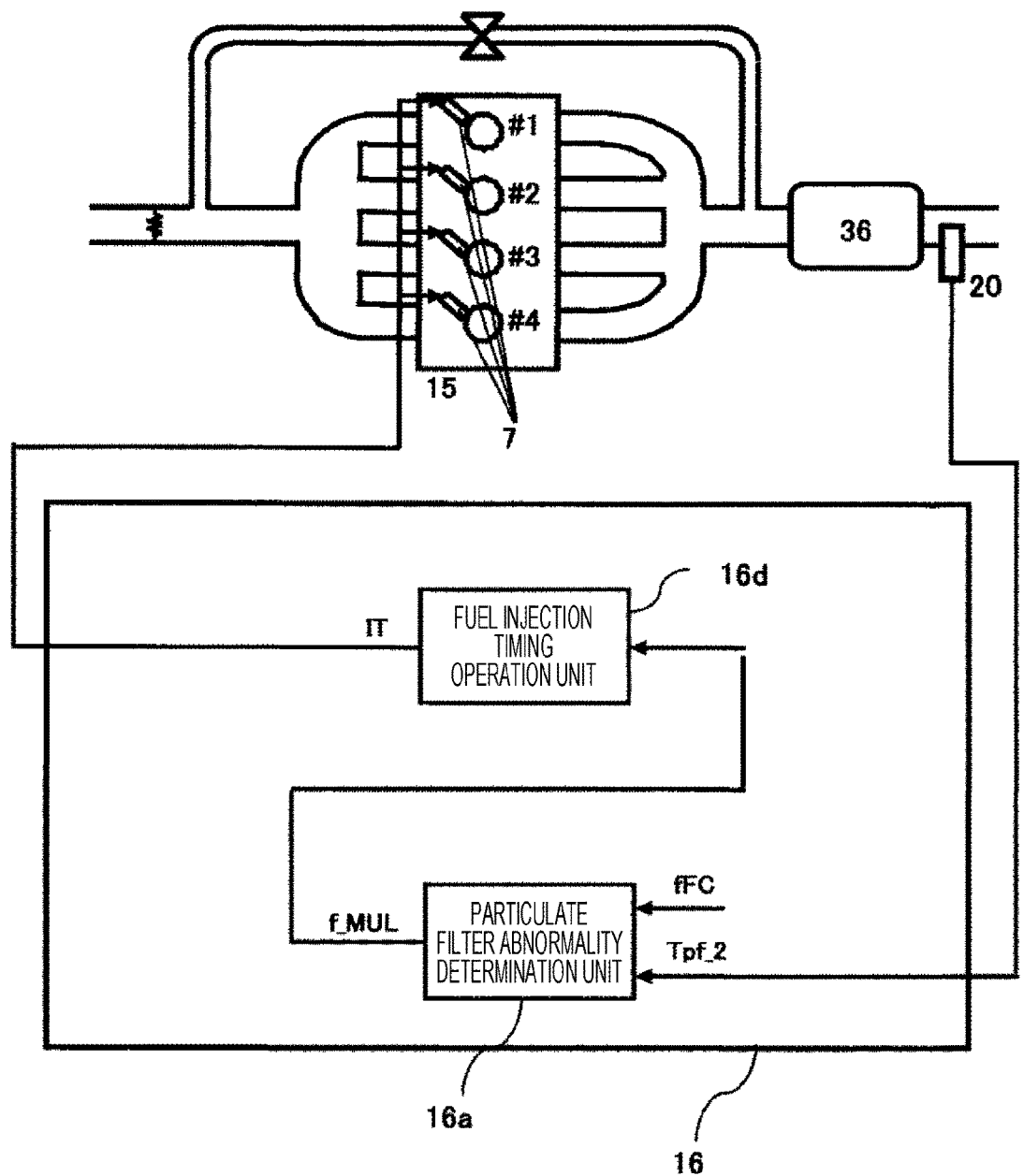
FIG. 21 is a block diagram illustrating a function of a control unit according to a tenth embodiment of the present invention.
Figure 22:
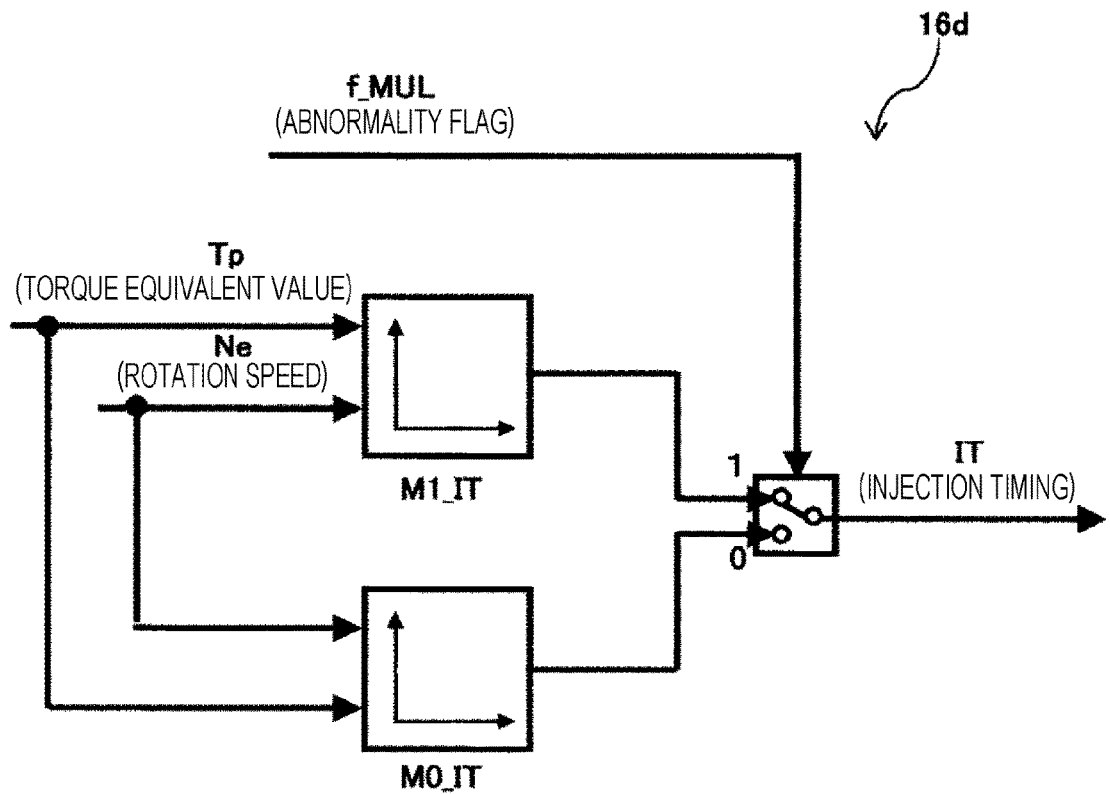
FIG. 22 is a block diagram of a fuel injection timing operation unit according to a tenth embodiment of the present invention.

Next, an application example of the present invention will be described using FIGS. 21 and 22. FIG. 21 is a block diagram illustrating a function of a control unit 16 according to a tenth embodiment of the present invention. FIG. 22 is a detail view of a fuel injection timing operation unit 16d illustrated in FIG. 21.

In this embodiment, the fuel injection timing operation unit 16d changes fuel injection timing, when it is determined that a particulate filter is abnormal. A particulate filter abnormality determination unit 16a is the same as that of the first embodiment illustrated in FIG. 4, for example.

As illustrated in FIG. 21, the control unit 16 includes the particulate filter abnormality determination unit 16a and the fuel injection timing operation unit 16d.

A fuel cut flag fFC and an output value Tpf_2 of a temperature sensor 20 of a downstream side of the particulate filter are input to the particulate filter abnormality determination unit 16a. The particulate filter abnormality determination unit 16a operates an abnormality flag f_MUL, on the basis of these input values.

The abnormality flag f_MUL is input to the fuel injection timing operation unit 16d. The fuel injection timing operation unit 16d acquires injection timing IT according to an input value.

Specifically, the fuel injection timing operation unit 16d operates the injection timing IT, as illustrated in FIG. 22. A sequence thereof is as follows.

i) When f_MUL=1, IT is acquired from Tp (torque equivalent value) and Ne (rotation speed) by referring to a map M1_IT.

ii) When f_MUL=0, the injection timing IT is acquired from Tp (torque equivalent value) and Ne (rotation speed) by referring to a map M0_IT.

Here, the map M0_IT may be determined by considering performance such as fuel consumption, exhaust, and stability. The map M1_IT is preferably set to injection timing when an emission amount of soot from an engine decreases. For Tp, a torque equivalent value illustrated in FIG. 17 may be used.

When it is determined that performance of the particulate filter is degraded, at least one of the division fuel injection number of times and the fuel injection pressure may be changed to reduce an emission amount of soot emitted from the engine.

As described above, according to this embodiment, when performance degradation of the particulate filter is detected, the fuel injection timing used as a parameter to control the engine can be changed. That is, the control unit 16 functions as a change unit to change the parameter to control the engine, when it is determined that the particulate filter is degraded.

(Eleventh Embodiment)

Figure 23:
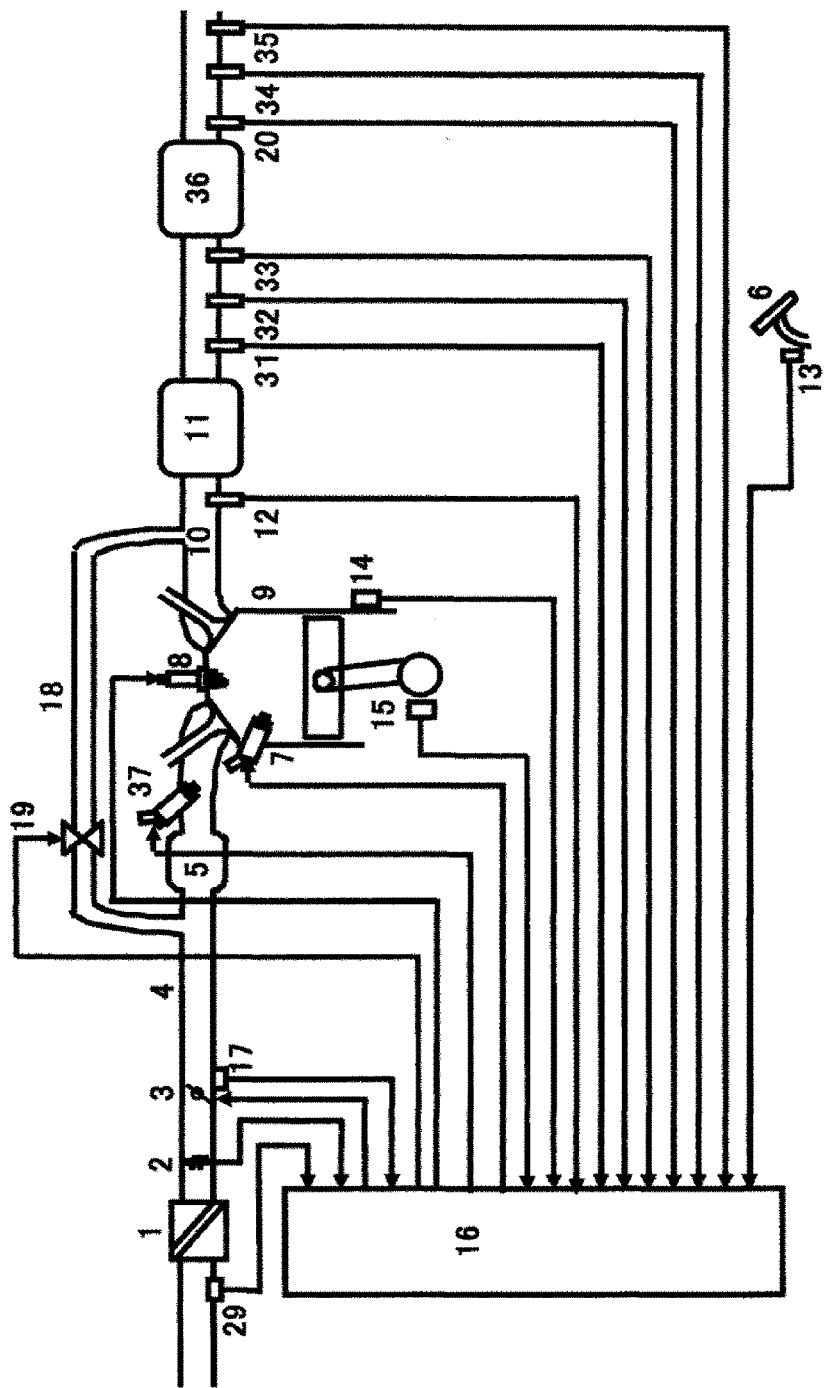
FIG. 23 is a system configuration diagram of an engine including a control unit according to an eleventh embodiment of the present invention.

Next, another application example of the present invention will be described using FIGS. 23 to 26. FIG. 23 is a system configuration diagram of an engine 9 including a control unit 16 according to an eleventh embodiment of the present invention. In this embodiment, a fuel injection valve 37 for port injection is added to a configuration illustrated in FIG. 1.

Figure 24:
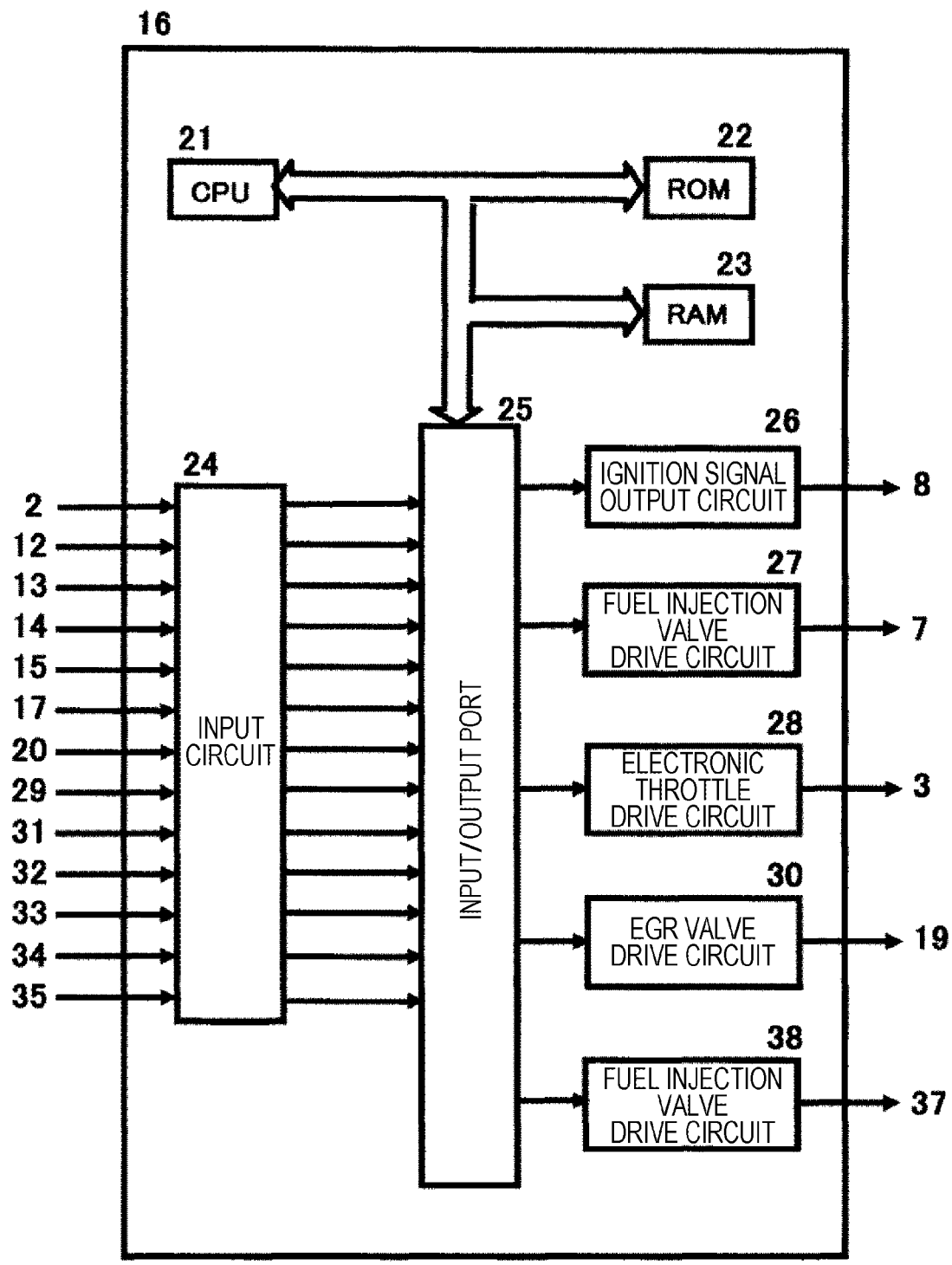
FIG. 24 is a configuration diagram illustrating an inner portion of a control unit according to an eleventh embodiment of the present invention.

FIG. 24 is a configuration diagram illustrating an inner portion of the control unit 16 illustrated in FIG. 23. In this embodiment, a fuel injection valve drive circuit 38 for port injection is added to a configuration illustrated in FIG. 2.

Figure 25:
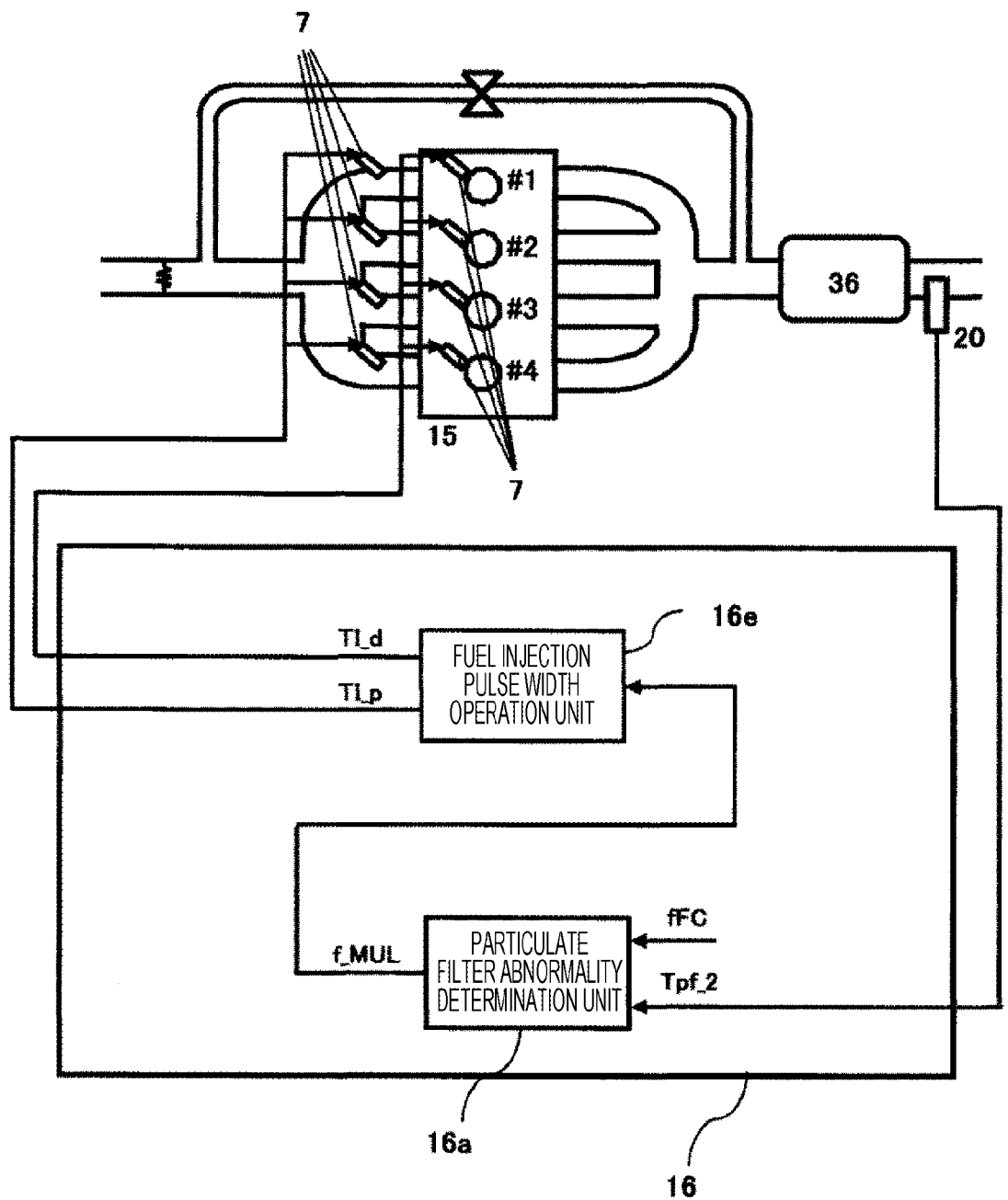
FIG. 25 is a block diagram illustrating a function of a control unit according to an eleventh embodiment of the present invention.

FIG. 25 is a block diagram illustrating a function of the control unit 16 according to the eleventh embodiment of the present invention. FIG. 26 is a detail view of a fuel injection pulse width operation unit 16e illustrated in FIG. 25.

In this embodiment, when it is determined that the particulate filter is abnormal, the fuel injection pulse width operation unit 16e changes injection amount ratios of port injection and cylinder injection. A particulate filter abnormality determination unit 16a is the same as that of the first embodiment illustrated in FIG. 4, for example.

As illustrated in FIG. 25, the control unit 16 includes the particulate filter abnormality determination unit 16a and the fuel injection pulse width operation unit 16e.

A fuel cut flag fFC and an output value Tpf_2 of a temperature sensor 20 of a downstream side of the particulate filter are input to the particulate filter abnormality determination unit 16a. The particulate filter abnormality determination unit 16a operates an abnormality flag f_MUL, on the basis of these input values.

The abnormality flag f_MUL is input to the fuel injection pulse width operation unit 16e. The fuel injection pulse width operation unit 16e acquires a fuel injection pulse width TI_d for cylinder injection and a fuel injection pulse width TI_p for port injection, according to an input value. Here, when it is determined that the particulate filter is abnormal, the fuel injection pulse width operation unit 16e changes injection ratios of the fuel injection pulse width TI_d for the cylinder injection and the fuel injection pulse width TI_p for the port injection.

Specifically, the fuel injection pulse width operation unit 16e operates the fuel injection pulse width TI_d for the cylinder injection and the fuel injection pulse width TI_p for the port injection, as illustrated in FIG. 26. A sequence thereof is as follows.

i) When f_MUL=1, a ratio R_TI_d of a fuel injection pulse width for cylinder injection is acquired from Tp (torque equivalent value) and Ne (rotation speed) by referring to a map M1_r.

ii) When f_MUL=0, R_TI_d is acquired from Tp (torque equivalent value) and Ne (rotation speed) by referring to a map M0_r.

Here, the ratio R_TI_d of the fuel injection pulse width for the cylinder injection is a value satisfying $0 \leq R\_TI\_d \leq 1$.

The fuel injection pulse width operation unit 16e multiplies a necessary fuel injection pulse width TI with the ratio R_TI_d of the fuel injection pulse width for the cylinder injection and acquires the fuel injection pulse width TI_d for the cylinder injection. In addition, the fuel injection pulse width operation unit 16e uses a value obtained by multiplying the necessary fuel injection pulse width TI with (1−R_TI_d) as a fuel injection pulse width TI_p for the port injection. Here, a ratio of the port injection is set to be larger than a ratio of the cylinder injection, so that soot contained in exhaust gas decreases.

The necessary fuel injection pulse width TI is an amount of fuel to be supplied to a combustion chamber and is determined from a required torque and a required air-fuel ratio. In addition, because operation methods of the necessary fuel injection pulse width TI are described in a lot of documents and are known, description thereof is omitted.

Here, the map M0_r may be determined by considering performance such as fuel consumption, exhaust, and stability. M1_r is preferably set to injection timing when an emission amount of soot from an engine decreases. For Tp, a torque equivalent value illustrated in FIG. 17 may be used.

As described above, according to this embodiment, when performance degradation of the particulate filter is detected, the ratios of the injection amounts of the port injection and the cylinder injection used as parameters to control the engine can be changed.

The present invention is not limited to the embodiments described above and various modifications are included in the present invention. The embodiments are described to facilitate understanding of the present invention and the present invention is not limited to embodiments in which all of the described configurations are included. In addition, a part of the configurations of the certain embodiment can be replaced by the configurations of another embodiment or the configurations of another embodiment can be added to the configurations of the certain embodiment. In addition, for a part of the configurations of the individual embodiments, addition/removal/replacement of other configurations can be performed.

For example, the control unit 16 may include a report unit to report that the particulate filter is degraded. As one example, when it is determined that the performance of the particulate filter is degraded, the report unit turns on an engine check lamp to report that the particulate filter is degraded.

In the embodiments described above, a period in which the fuel injection stops and the engine rotates inertially is assumed. However, the present invention is not limited thereto. For example, a period in which the fuel injection stops and the engine is rotated by drive power of a motor may be used. In addition, a period in which the fuel injection stops and the engine is rotated by power transmitted from a road surface may be used.

That is, a period in which the fuel injection stops and the engine rotates, so that air flows into the particulate filter, may be used. In addition, the inertial rotation means that the engine rotates without depending on explosion power of the fuel (gasoline).

REFERENCE SIGNS LIST

1 air cleaner
2 air flow sensor
3 electronic throttle
4 intake pipe
5 collector
6 accelerator
7 fuel injection valve for cylinder injection
8 ignition plug
9 engine
10 exhaust pipe
11 three-way catalyst
12 A/F sensor
13 accelerator opening sensor
14 water temperature sensor
15 engine rotation number sensor
16 control unit
16a particulate filter abnormality determination unit
16b particulate filter soot trap amount estimation unit
16c fuel cut particulate filter downstream temperature prediction value operation unit
16d fuel injection timing operation unit
16e fuel injection pulse width operation unit
17 throttle opening sensor
18 exhaust recirculation pipe
19 exhaust recirculation amount adjustment valve
20 particulate filter downstream temperature sensor
21 CPU mounted in control unit
22 ROM mounted in control unit
23 RAM mounted in control unit
24 input circuit of various sensors mounted in control unit
25 port to input various sensor signals and output actuator operation signal
26 ignition signal output circuit to output drive signal to ignition plug at appropriate timing
27 fuel injection valve drive circuit to output appropriate pulse to fuel injection valve for cylinder injection
28 electronic throttle drive circuit
29 intake air temperature sensor
30 exhaust recirculation amount adjustment valve drive circuit
31 particulate filter upstream temperature sensor
32 particulate filter upstream O2 concentration sensor
33 particulate filter upstream CO2 concentration sensor
34 particulate filter downstream O2 concentration sensor
35 particulate filter downstream CO2 concentration sensor
36 particulate filter
37 fuel injection valve for port injection
38 fuel injection valve drive circuit to output appropriate pulse to fuel injection valve for port injection

The invention claimed is:

1. An engine control apparatus for an engine having a particulate filter that traps particulate substances in engine exhaust gas, comprising:
a sensor arranged to provide a signal representative of temperature of the exhaust gas of the engine inside or downstream of the particulate filter; and
a processor communicatively coupled to the sensor and configured to:
receive, from the sensor, a first signal indicating a temperature of the exhaust gas inside or downstream of the particulate filter; and
determine whether the particulate filter is degraded, on the basis of the temperature of the first signal being equal to or smaller than a first threshold value in a period in which fuel supply to the engine is blocked.

2. The engine control apparatus according to claim 1, wherein the processor:
determines whether the particulate filter is degraded, when the engine rotates and air flows into the particulate filter, in the period in which the fuel supply to the engine is blocked.

3. The engine control apparatus according to claim 1, wherein the processor is configured to:
determine that the particulate filter is degraded, when a state in which the temperature is equal to or smaller than the first threshold value and the temperature is larger than an eighth threshold value smaller than the first threshold value continues for the period, and
prohibit the determination on whether the particulate filter is degraded, when the temperature is equal to or smaller than the eighth threshold value.

4. The engine control apparatus according to claim 1, wherein the processor is further configured to:
report that the particulate filter is degraded, when it is determined that the particulate filter is degraded, or
change parameters to control the engine, when it is determined that the particulate filter is degraded.

5. The engine control apparatus according to claim 1, wherein the sensor is further arranged to provide a signal indicating a state of exhaust gas, wherein the state of the exhaust gas indicates a degree of an oxidation reaction of the particulate substances trapped by the particulate filter.

6. The engine control apparatus according to claim 5, wherein the sensor provides the signal based on soot trapped in the sensor; and
the processor is configured to estimate a temperature of the exhaust gas in the inside or downstream of the particulate filter, on the basis of an estimation value of an amount of soot trapped in the particulate filter.

7. The engine control apparatus according to claim 1, wherein the processor:
receives a second signal indicating a state of the exhaust gas in an upstream of the particulate filter, and determines whether the particulate filter is degraded, on the basis of the state of the exhaust gas indicated by the first signal and the state of the exhaust gas indicated by the second signal, in the period in which the fuel supply to the engine is blocked.

8. The engine control apparatus according to claim 7, wherein
the second signal indicates a temperature of the exhaust gas in the upstream of the particulate filter, and
the processor further determines that the particulate filter is degraded, when a state in which a difference of the temperature indicated by the first signal and the temperature indicated by the second signal is equal to or smaller than a fourth threshold value continues for a fourth period.

9. The engine control apparatus according to claim 7, wherein
the second signal indicates a temperature of the exhaust gas in the upstream of the particulate filter, and
the processor further determines that the particulate filter is degraded, when a state in which a difference of a first difference of the temperature indicated by the second signal and the temperature indicated by the first signal at timing when the fuel supply to the engine is blocked and a second difference of the temperature indicated by the second signal and the temperature indicated by the first signal at predetermined timing of the period in which the fuel supply to the engine is blocked is equal to or smaller than a seventh threshold value continues for a seventh period.

10. An engine control apparatus for an engine having a particulate filter that traps particulate substances in engine exhaust gas, comprising:
a sensor arranged to measure oxygen concentration of the exhaust gas inside or downstream of the particulate filter; and
a processor communicatively coupled to the sensor and configured to:
receive, from the sensor, a first signal indicating an the oxygen concentration of the exhaust gas in the inside or downstream of the particulate filter, and
determine that the particulate filter is degraded, when a state in which the oxygen concentration is equal to or larger than a second threshold value continues for a second period in which a fuel supply to the engine is blocked.

11. The engine control apparatus according to claim 10, wherein
a second signal indicates an oxygen concentration of the exhaust gas in an upstream of the particular filter, and
the processor further determines that the particulate filter is degraded, when a state in which a difference of the oxygen concentration indicated by the second signal and the oxygen concentration indicated by the first signal is equal to or smaller than a fifth threshold value continues for a fifth period.

12. An engine control apparatus for an engine having a particulate filter that traps particulate substances in engine exhaust gas, comprising:
a sensor arranged to measure carbon dioxide concentration of the exhaust gas inside or downstream of the particulate filter; and
a processor communicatively coupled to the sensor and configured to:
receive, from the sensor, a first signal indicating the carbon dioxide concentration in the inside or downstream of the particulate filter, and
determine that the particulate filter is degraded, when a state in which the carbon dioxide concentration is equal to or smaller than a third threshold value continues for a third period in which a fuel supply to the engine is blocked.

13. The engine control apparatus according to claim 12, wherein
a second signal indicates a carbon dioxide concentration of the exhaust gas in an upstream of the particulate filter, and
the processor further determines that the particulate filter is degraded, when a state in which a difference of the carbon dioxide concentration indicated by the first signal and the carbon dioxide concentration indicated by the second signal is equal to or smaller than a sixth threshold value continues for a sixth period.

* * * * *